(12) United States Patent
Brownsword et al.

(10) Patent No.: US 10,768,982 B2
(45) Date of Patent: Sep. 8, 2020

(54) ENGINE FOR REACTIVE EXECUTION OF MASSIVELY CONCURRENT HETEROGENEOUS ACCELERATED SCRIPTED STREAMING ANALYSES

(71) Applicant: Oracle International Corporation, Redwood Shores, CA (US)

(72) Inventors: Andrew Brownsword, Bowen Island (CA); Tayler Hetherington, Vancouver (CA); Pavan Chandrashekar, Vancouver (CA); Akhilesh Singhania, Zurich (CH); Stuart Wray, Cambridge (GB); Pravin Shinde, Zurich (CH); Felix Schmidt, Niederweningen (CH); Craig Schelp, Surrey (CA); Onur Kocberber, Zurich (CH); Juan Fernandez Peinador, Barcelona (ES); Rod Reddekopp, Surrey (CA); Manel Fernandez Gomez, Barcelona (ES); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 22 days.

(21) Appl. No.: 16/135,802

(22) Filed: Sep. 19, 2018

(65) Prior Publication Data
US 2020/0089529 A1    Mar. 19, 2020

(51) Int. Cl.
*G06F 9/54* (2006.01)
*G06F 9/48* (2006.01)
(Continued)

(52) U.S. Cl.
CPC .......... *G06F 9/4881* (2013.01); *G06F 9/3877* (2013.01); *G06F 9/45533* (2013.01);
(Continued)

(58) Field of Classification Search
CPC ............................ G06F 9/45533; G06F 9/546
(Continued)

(56) References Cited

U.S. PATENT DOCUMENTS 8,732,291 B2   5/2014 Zhu et al.
8,955,112 B2   2/2015 Nguyen et al.
(Continued)

OTHER PUBLICATIONS

Liu et al., "Survey of Real-time Processing Systems for Big Data", IDEAS '14 Jul. 7-9, 2014, Porto, Portugal Copyright 2014 ACM, 6 pages.
(Continued)

*Primary Examiner* — Andy Ho
(74) *Attorney, Agent, or Firm* — Hickman Palermo Becker Bingham LLP

(57) ABSTRACT

Herein are techniques for analysis of data streams. In an embodiment, a computer associates each software actor with data streams. Each software actor has its own backlog queue of data to analyze. In response to receiving some stream content and based on the received stream content, data is distributed to some software actors. In response to determining that the data satisfies completeness criteria of a particular software actor, an indication of the data is appended onto the backlog queue of the particular software actor. The particular software actor is reset to an initial state by loading an execution snapshot of a previous initial execution of an embedded virtual machine. Based on the particular software actor, execution of the execution snapshot of the previous initial execution is resumed to dequeue and process the indication of the data from the backlog queue of the particular software actor to generate a result.

68 Claims, 11 Drawing Sheets

(51) Int. Cl.
| | |
|---|---|
| *G06F 11/30* | (2006.01) |
| *G06F 9/38* | (2018.01) |
| *G06F 9/455* | (2018.01) |
| *G06N 20/00* | (2019.01) |
| *G06F 16/11* | (2019.01) |
| *G06F 16/18* | (2019.01) |

(52) U.S. Cl.
CPC .......... *G06F 11/301* (2013.01); *G06F 16/128* (2019.01); *G06F 16/1805* (2019.01); *G06N 20/00* (2019.01); *G06F 2009/45575* (2013.01)

(58) Field of Classification Search
USPC .............................................. 718/1; 719/314
See application file for complete search history.

(56) References Cited

U.S. PATENT DOCUMENTS

| | | | |
|---|---|---|---|
| 9,430,213 | B2 | 8/2016 | Fu et al. |
| 9,667,489 | B2 | 5/2017 | Morris et al. |
| 9,720,763 | B2 | 8/2017 | Rajasekharah et al. |
| 10,158,726 | B2 | 12/2018 | Chou et al. |
| 10,230,600 | B2 * | 3/2019 | Bhasin .................. H04L 43/067 |
| 2014/0337516 | A1 | 11/2014 | Naseh et al. |
| 2017/0295082 | A1 | 10/2017 | Wu |
| 2017/0366428 | A1 | 12/2017 | Shaw et al. |
| 2018/0295154 | A1 | 10/2018 | Crabtree |
| 2019/0041845 | A1 | 2/2019 | Cella |

OTHER PUBLICATIONS

Liu et al., "Cloud Resource Orchestration: A DataCentric Approach", 5th Biennial Conference on Innovative Data Systems Research (CIDR '11) Jan. 2011, Asilomar, California, USA, 8 pages.

Calcaterra et al., "Combining TOSCA and BPMN to Enable Automated Cloud Service Provisioning" dated 2017, 10 pages.

Cisco Public, "Cisco CloudCenter Solution: Architecture Overview", dated 2017, 10 pages.

Cloud Tidbits Column, "Containers and Cloud: From LXC to Docker to Kubernetes", dated Sep. 2014, 4 pages.

Dukaric, "Towards a Unified Taxonomy and Architecture of Cloud Frameworks", Future Generation Computer Systems dated 2013, 5 pages.

Fujitsu, "Fujitsu FlexFrame® Orchestrator V1.1A Solution", Data Sheet, FlexFrame® Orchestrator V1.1A, dated Dec. 15, 2014, 6 pages.

IBM, "IBM Cloud Orchestrator Enterprose Edition Extends Cloud Management Capabilities of IBM Cloud Orchestrator with Integrated Monitoring and Cost Management" dated Dec. 15, 2015, 12 pages.

Katsaros et al., "Cloud application portability with TOSCA, Chef and Openstack", dated Mar. 2014, 9 pages.

Kontena at Github, "The Automated Container Deployment Pipeline", Dated Feb. 9, 2017, 8 pages.

Andrikopoulos et al., "Optimal Distribution of Applications in the Cloud", dated 2014, 6 pages.

Kouchaksaraei et al., "Pishahang: Joint Orchestration of Network Function Chains and Distributed Cloud Applications", dated 2018, 3 pages.

Yamato et al., "Proposal of Optimum Application Deployment Technology for Heterogeneous IaaS Cloud", Proceedings of 2016 6th International Workshop on Computer Science and Engineering, 4 pages.

Octopus Deploy, "Getting Started" https://octopus.com/docs/getting-started, last viewed on Apr. 17, 2019, 8 pages.

Prassanna et al., "A Review of Existing Cloud Automation Tools", dated 2017, 4 pages.

Shalom, Nati, "Orchestration Tool Roundup—Docker Swarm vs. Kubernetes, TerraForm vs. TOSCA/Cloudify vs. Heat", dated Jun. 11, 2015, 9 pages.

Sonata, "D7.5 Market Fesibility Study", dated Jan. 5, 2015, 75 pages.

System Evolution, "Borg, Omega, and Kubernetes", dated 2016, 24 pages.

Varma et al., "Comparative Study of Various Platform as a Service Frameworks", International Journal on Cloud Computing: Services and Architecture (IJCCSA) vol. 6, No. 1, Feb. 2016, 12 pages.

Wettinger et al., "Integrating Configuration Management with Model-driven Cloud Management based on TOSCA", dated 2013, 7 pages.

Yamato et al., "Development of Template Management Technology for Easy Deployment of Virtual Resources on OpenStack", Journal of Cloud Computing: Advances, Systems and Applications dated 2014, 12 pgs.

Kouchaksaraei et al., "Joint Orchestration of Cloud-Based Microservices and Virtual Network Functions", dated Jan. 1, 2018, 2 pages.

Koceberber, U.S. Appl. No. 16/271,535, filed Feb. 8, 2020, Office Action dated May 13, 2020.

* cited by examiner

ENGINE FOR REACTIVE EXECUTION OF MASSIVELY CONCURRENT HETEROGENEOUS ACCELERATED SCRIPTED STREAMING ANALYSES

FIELD OF THE INVENTION

The present invention relates to stream analytics. Herein are techniques for sustainable live analysis of content of long lived streams of data.

BACKGROUND

Enterprise cloud data centers contain an enormous number of potential data sources such as hosts, switches, and appliances. Each of these sources may provide one or many data streams, and there is an immense variety of analyses which can be performed on these data streams. The nature and volume of this data and analysis is such that it is desirable to execute the analyses on an on-going real-time basis in order to generate additional downstream signal streams that are more useful to the operators of the data center. Individually these analyses might be very simple (e.g. just a threshold), or substantially complex (e.g. log parsing and analysis using advanced machine learning techniques). In any case, compute efficiency is important for monitoring as large a data center as possible with as few hosts as possible, and to minimize the set of machines across which the input data needs to be distributed for horizontal scaling.

Existing solutions to this general problem include: (a) distributed compute engines such as Apache Spark, (b) stream processing built into time-series systems such as InfluxDB Prometheus, Grafana, and Kapacitor/Chronograf, and (c) ad hoc solutions. Analytics engines such as Spark distribute big computations over a large set of hosts, often ignoring host-level inefficiency in favor of horizontal scale (i.e. more hosts). The stream processing engines in time-series systems are usually limited in scope and capabilities, such as being limited to trivial calculations on individual time-series, little or no state, little concern for computational efficiency, etc. Ad hoc solutions typically end up relying on an operating system for resource management, and do not benefit from knowledge about an entire system workload and its data streams.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are computerized techniques for sustainable live analysis of content of long lived streams of data. These techniques perform stream analytics based on resettable software actors that are kept free of residual state. In an embodiment, a computer associates each software actor with data streams. A stream analysis actor (a.k.a. software actor) is an encapsulation of a potentially independent analysis to be applied to some of available data stream(s). Each software actor has its own backlog queue of stream data to analyze. In response to receiving content in some of the data streams and based on the received stream content, data is distributed to some software actors that are associated with the data streams. In response to determining that the data satisfies completeness criteria of a particular software actor, an indication of the data is appended onto the backlog queue of the particular software actor. The particular software actor is reset to an initial state by loading, into computer memory, an execution snapshot of a previous initial execution of an embedded virtual machine. Based on the particular software actor, execution of the execution snapshot of the previous initial execution is resumed to dequeue and process the indication of the data from the backlog queue of the particular software actor to generate a result.

In an embodiment, the embedded virtual machine is a Lua virtual machine (VM). Lua is a high level programing language with a byte-coded virtual machine. Multiple Lua VMs may be embedded in a same address space, such as that of a host C program. An execution snapshot may be implemented with a LuaState object that is a standard part of Lua. The software actors create, share, and consume Lua tables that may be part of the execution snapshot of the previous initial execution. Interoperation of multiple software actors may be facilitated by shared memory.

In an embodiment, a pool of pre-initialized and idle embedded virtual machines may facilitate load balancing and prioritization of analyses. Capacities of the pool and of underlying processing hardware may facilitate various forms of concurrency including pipeline parallelism and horizontal scaling. In an embodiment, shared bitmaps that track pending demand are protected by atomic machine instructions to minimize contention.

1.0 Example Computer

Figure 1:
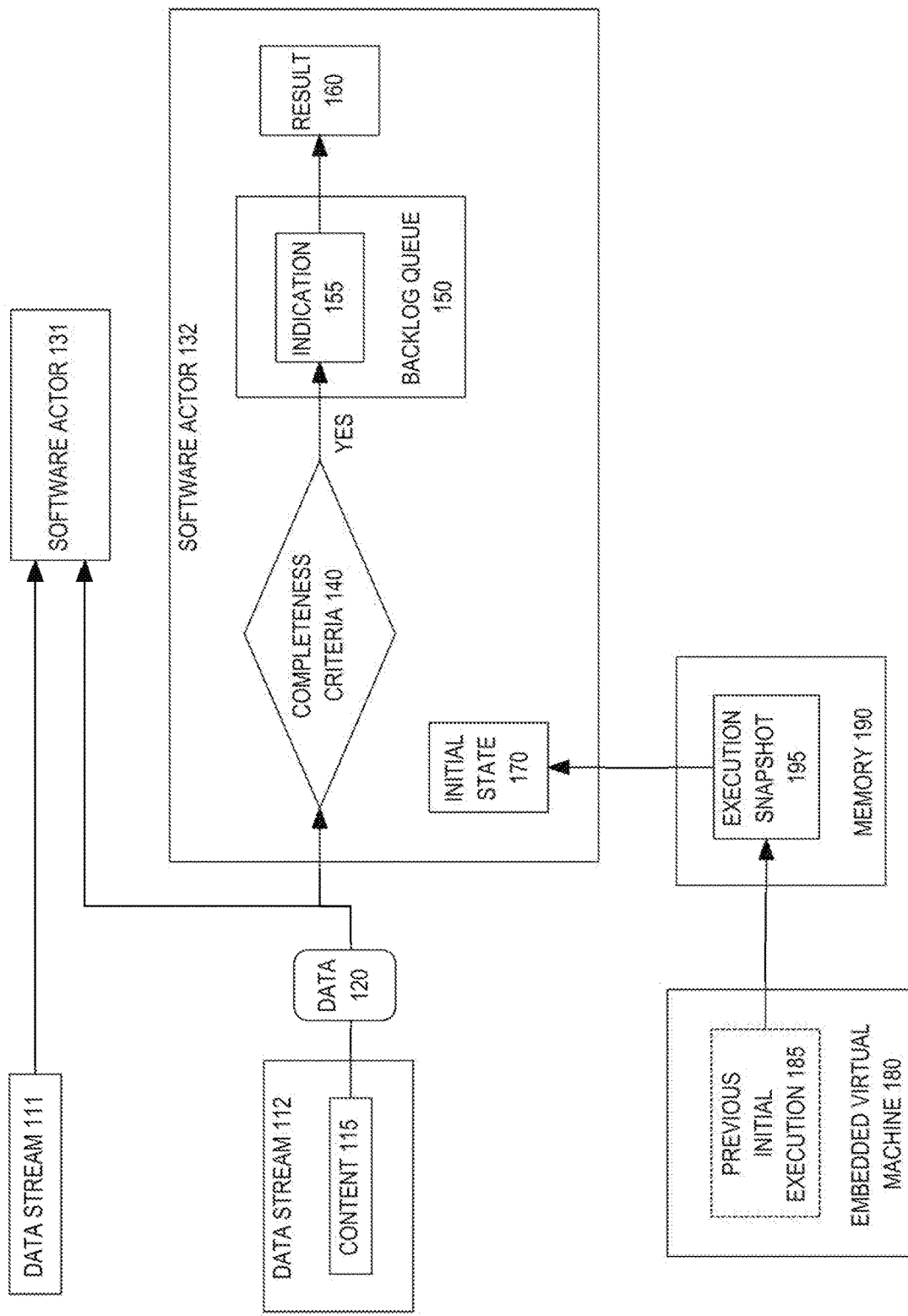
FIG. 1 is a block diagram that depicts an example computer that repeatedly reloads a same initial execution snapshot of an embedded virtual machine to reset a stream analysis actor.

FIG. 1 is a block diagram that depicts an example computer 100, in an embodiment. Computer 100 repeatedly reloads a same initial execution snapshot of an embedded virtual machine to reset a stream analysis actor. Computer 100 may be one or more of a rack server such as a blade, a personal computer, a mainframe, or other computing device.

As discussed elsewhere herein, computer 100 may execute one or more computer system processes comprising instructions and data. Computer 100 may or may not have an operating system that schedules execution of system processes. Each system process may or may not have its own address space and execution threads, such as lightweight threads. Each system process may host one or more analysis actors as discussed later herein.

1.1 Stream Analytics

Computer 100 receives, generates, or loads various data stream(s) such as 111-112. A data stream may have a sequence of binary and/or textual data. For example, data stream 112 delivers content 115 that may be composed of discrete events, records, or time series data such as measurements. For example, data stream 112 may relay remote sensor telemetry, network traffic data that is raw or summarized, one or more console (e.g. stdout) logs of system or application process(es), events or records such as for complex event processing (CEP), a transactional ticker tape or crawl, a (e.g. syndicated) feed such as a newsfeed or publish/subscribe (pub/sub) topic, or time series data. Data stream 112 may arrive, with or without buffering, as network packets on a socket, disk blocks from a file, messages in an inter-process communication (IPC) pipe, or data generated in process. Data streams 111-112 may or may not have a bandwidth or data rate that is high. Data streams 111-112 may or may not be related to each other in content or source. Data stream 111-112 may be compressed, encoded, encrypted, and/or formatted as more or less human readable text. Data streams 111-112 may arrive as a continuous stream, in batches, or as intermittent individual events.

Computer 100 may buffer content 115 as received to absorb a volume spike. Hard or soft deadlines of various frequencies for processing received content 115 may or may not be imposed upon computer 100. For example, content 115 may have one or more times to live (TTL) that may or may not impose processing deadlines. Buffer (not shown) saturation may effectively impose processing deadlines.

1.2 Software Actors

A stream analysis actor (a.k.a. software actor) is an encapsulation of a potentially independent analysis to be applied to some of available data stream(s). Each of software actors 131-132 execute associated instructions to process some of the data stream(s) according to a respective algorithm. Although software actor(s) are hosted in a same or different system process(es), such as a computer program, the lifecycle of each software actor is potentially independent. For example, one software actor may be reset, activated, or idled without necessarily affecting another software actor that is hosted in a same computer program. As explained later herein, software actors of a same type may share same instructions, although those actors may execute asynchronously to each other. Example implementations and containers of software actors are discussed later herein, such as each software actor hosted in its own Lua virtual machine that is hosted in a monolithic computer program, such as one shared by some or all software actors and separately programmed with the C language. In an embodiment, the computer program schedules executions of the software actors, as described later herein.

Analytic processing of data streams 111-112 may exploit concurrency in various ways to increase system throughput of computer 100. For example, stream analytics may be decomposed into different algorithms that may concurrently process same or different data. For example, content 115 may be suspicious network traffic that software actor 131 scans for viruses, while software actor 132 may also simultaneously scan same content 115 for other kinds of network attacks. Distribution of content 115 to software actors 131-132 for processing may entail content based routing. For example, content 115 may be a mix of buy and sell orders, such that software actor 131 processes buy orders, and software actor 132 processes sell orders. Stream analytics may entail pipeline parallelism such that software actor 131 preprocesses content 115 for further processing by software actor 132. Horizontal scaling may increase the bandwidth of computer 100. For example, software actor 131-132 may perform a same analysis, and separate portions of content 115 may be respectively distributed to software actors 131-132 for parallel processing.

Software actors 131-132 may expect same or different formatting and/or conversion of content 115. For example, software actor 131 may expect metric units, while software actor 132 expects imperial units for the same data. Software actors 131-132 may expect a same or different subset (i.e. projection) of fields from each record/event in content 115. Thus, content 115 may be subjected to one or more alternate translations, shown as data 120, for deliver to particular software actors. Although only one data 120 is shown for injection into both software actors 131-132, different translations of same data extracted from content 115 may be needed to separately supply software actors 131-132 with data.

1.3 Backlog Queue

Content 115 may arrive in various logical units, such as records, events, fields, or name-value pairs that may need logical assembly before analytics may occur. Collating or other refactoring of content 115 may be needed for logical reassembly. For example, fields of multiple records may be interleaved. Physical fragmentation and reassembly may also be involved, perhaps due to packetized transport. In any case, computer 100 may buffer data 120 for one or multiple software actors, at least until sufficient data 120 is accumulated to represent a complete record or event to be analyzed. Data 120 may be incrementally examined or examined as a buffered whole for sufficiency for subsequent analysis. Completeness criteria 140 detect such sufficiency. Completeness criteria 140 may detect completeness according to a threshold. For example, a record may occur for every eighty bytes of content 115. Completeness criteria 140 may detect completeness according to grammar, syntax, or semantics. For example, data 120 may contain a flag or a magic value that separates records, or a record may be complete after accumulation of required fields.

Each software actor may have its own completeness criteria. Each software actor may also have its own backlog queue of records/events that are completely assembled and awaiting analytics by the software actor. For example, software actor 132 has backlog queue 150. Each time completeness criteria 140 are satisfied, an indication (e.g. 155) of a record or event (not shown) is appended to backlog queue 150. Indication 155 is more or less lean. For example, indication 155 may essentially contain only a reference, such as a memory pointer, address, or buffer offset that refers to a record/event that is stored elsewhere in memory 190 and that satisfied completeness criteria 140. Although not shown, backlog queue 150 may contain multiple indications. For example, backlog queue 150 may be a circular buffer, a linked list, or other first-in first-out (FIFO) data structure suitable for residing in (e.g. volatile) memory.

Eventually, such as when backlog queue 150 becomes full, or periodically according to a schedule or time to live, or opportunistically when processing resource availability momentarily arises, software actor 132 may begin processing of one, some, or all indications within backlog queue 150. Thus, backlog queue 150 eventually feeds records/events into software actor 132 for actual analytics that may produce result 160. Result 160 may be generated for each individual event, or for multiple events indicated in backlog queue 150. Result 160 may be an aggregate statistic, such as a running average or total, or a discrete digest of a given event, such as a flag that indicates whether or not the event is special, as detected by the analysis. Result 160 may itself form another data stream to be consumed by a downstream software actor. Thus, pipeline parallelism may be achieved by daisy chained software actors.

1.4 Residual State and Reset

Unsustainability is endemic to stream analytics. Defect free software is difficult to achieve, without which a software actor may malfunction sooner or later. A defect that is triggered soon or frequently is somewhat easy to discover and patch during laboratory testing. A defect that is rarely triggered may escape testing unnoticed and be unwittingly released into production, such as into the wild (i.e. widespread field deployment). That is somewhat likely for minor defects, such as with an edge condition, or latent defects, such as a memory leak. A long lived software actor, as a memory constrained state machine, may eventually fail, as with an occasionally hiccup (i.e. malfunction for a current event) or as a catastrophe, such as a deadlock. Depending on a testing duration, a mean time between failure (MTBF) may remain undiscovered during testing. In production, that fate may be more or less avoided by occasionally (e.g. periodically, by time or by throughput) resetting a software to a known state. For example, before processing each event, or after each emptying of backlog queue 150, software actor 132 may be reset to initial state 170 that is pristine (i.e. devoid of residual processing history). That reset is accomplished by loading execution snapshot 195 into the memory of software actor 132.

1.5 Embedded Virtual Machine

Computer 100 may host a single monolithic software program (not shown) that is responsible for analytics upon data streams 111-112. For example, the monolithic program may be a native executable for computer 100. Within the monolithic program are software actors 131-132 that are dedicated to respective analytic algorithms that consume data streams 111-112. Each of software actors 131-132 may execute in a same or separate embedded virtual machine, such as 180, that is a subsystem of the monolithic program. For example, embedded virtual machine 180 may execute software actor 132, and a separate embedded virtual machine (not shown) may execute software actor 131, and both virtual machines are embedded within the monolithic program.

An embedded virtual machine, such as 180, has its own internal state that is more or less independent of the state of whichever software actor is currently being executed by the virtual machine. The internal state embedded virtual machine 180 may be copied, and the copy may later be loaded into a same or different embedded virtual machine. That copy is shown as execution snapshot 195. Execution snapshot 195 may be loaded into memory 190 to more or less instantaneously drive an embedded virtual machine into a known state.

1.6 Execution Snapshot

The nature of execution snapshot 195 depends on the state of embedded virtual machine 180 when execution snapshot 195 is created. To be free of residual history (i.e. accumulated state from analytics), execution snapshot 195 is created from embedded virtual machine 180 during previous initial execution 185. In an embodiment, previous initial execution 185 initializes embedded virtual machine 180 and merely loads into virtual machine 180 infrastructural logic and data that implements an actor framework that is common to all software actors 131-132. In an embodiment, previous initial execution 185 also loads logic and/or data for particular software actor(s), such as one, some, or all software actors. No matter how much logic and/or data is loaded during previous initial execution 185, typically no content of any data streams are processed before creating execution snapshot 195. Thus, execution snapshot 195 is frozen in time, in a resumable way, that may later be loaded into any embedded virtual machine to cause a reset to a known clean state that is suitable for hosting a particular one, few, or any software actor.

For example, execution snapshot 195 may be loaded into memory 190 to reset software actor 132 back to initial state 170. Software actor 132 may repeatedly return to initial state 170 by repeatedly reloading same execution snapshot 195 into memory 190. Thus, execution snapshot 195 is reusable. Multiple copies of same execution snapshot 195 may be reloaded into memory at a same time into separate embedded virtual machine instances to achieve resetting of multiple instances of a same kind of software actor, such as 132, to achieve horizontal scaling. In an embodiment, different kinds of software actors need different execution snapshots made from separate previous initial executions. For example, whether same execution snapshot 195 is reusable for both kinds of software actors 131-132 depends on the embodiment. In an embodiment, computer 100 needs only one execution snapshot 195 which may be copied more or less without limit to repeatedly reset any of multiple embedded virtual machines and all kinds of software actors. In an embodiment, the monolithic program creates execution snapshot 195 every time the monolithic program is launched (i.e. started). In an embodiment, execution snapshot 195 is saved to disk for reuses across separate launches of the monolithic program.

In an embodiment, execution snapshot 195 contains memory address values (e.g. internal pointers) that may require either of: a) loading into memory 190 at a particular base address, or b) arithmetically adjusting the address values by some relocation amount, such as an arithmetic difference between a current base address and an original base address of execution snapshot 195. In an embodiment, execution snapshot 195 is compatible with a particular instance of a (e.g. hypervised) virtual machine, such that there are multiple execution snapshots respectively for multiple virtual machines, and resetting software actor 131 may entail rebooting a hypervised virtual machine.

2.0 Example Reset Process

Figure 2:
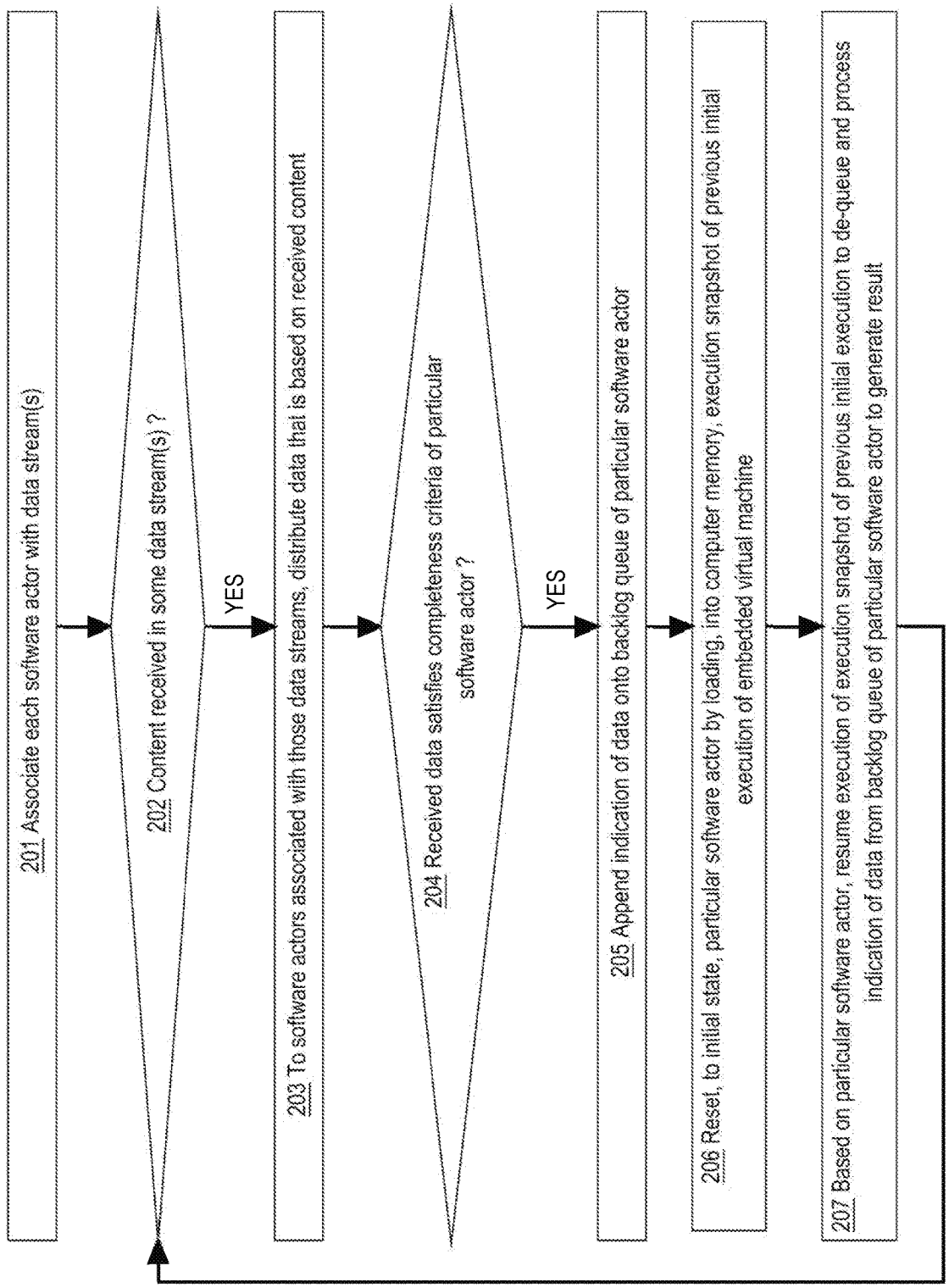
FIG. 2 is a flow diagram that depicts an example computer process for reloading a same initial execution snapshot of an embedded virtual machine to reset a stream analysis actor.

FIG. 2 is a flow diagram that depicts computer 100 reloading a same initial execution snapshot of an embedded virtual machine to reset a stream analysis actor, in an embodiment. FIG. 2 is discussed with reference to FIG. 1.

Step 201 is preparatory. In step 201, each software actor is associated with one, some, or all available data streams. For example, computer 100 may maintain a lookup table (not shown) that is keyed by stream or by actor to achieve a many-to-many association between actors and streams.

Steps 202-205 buffer and ingest received stream data without yet actually processing (e.g. analyzing) the data. Computer 100 is event driven. Thus, step 202 may wait until content is received on some data stream(s). For example, software actor 132 may wait until data 120 of content 115 is received from data stream 112. Software actor 131 may wait until data is received from either or both of data streams 111-112. For example, each of data streams 111-112 may flow into a respective communication socket. Unix's select function may sleep until data arrives on any of the sockets. Other ways of waiting include spinning and/or polling. Embodiments may use middleware such as Google protocol buffers, Apache Kafka or Spark, or Java message service (JMS) for managed streaming. For example, Intel Snap is dedicated to bearing telemetry streams.

In step 203, received data is distributed to interested software actors. For example, the arriving tip of content 115 may be buffered and/or examined to determine that some or all software actors that subscribe to data stream 112 may be interested in the arrival. Declarative mappings may describe fields to extract from content 115 and conversions and transformations of the extracted fields to generate data 120 in different or same ways for different interested software actors. For example, data 120 is synthesized from content 115, formatted, and then buffered (e.g. in memory).

Data 120 may merely be a fragment of a record or event. Step 204 waits until completion criteria of a software actor is satisfied, which means that a complete record/event is buffered and waiting to be consumed. For example, computer 100 may detect that data 120 is the final piece that completes a previously partially received event, which satisfies completeness criteria 140.

In step 205, an indication of the completely received event is appended onto the backlog queue of each interested software actor. For example, indication 155 is generated and appended onto backlog queue 150 of software actor 132.

2.1 Reload from Snapshot

Step 206, although shown in a sequence of steps, may be asynchronous (i.e. occur in a different ordering). For example, step 206 may instead occur as early as before step 202. However, step 206 should occur before step 207. In step 206, a particular software actor is reset to an initial state by loading, into memory, an execution snapshot of a previous initial execution of an embedded virtual machine. For example, an embedded virtual machine, such as 180, may have been previously used to process earlier data and may have been left in an unknown, dirty, or corrupt state. The embedded virtual machine may be reset to initial state 170 by loading execution snapshot 195 into memory 190. Execution snapshot 195 was created during previous initial execution 185 of a same or different embedded virtual machine. Techniques for creating and/or reloading execution snapshots are discussed later herein.

2.2 Unit of Work

Steps 205 and 207 may occur somewhat together or be separated by some delay due to any of: scheduling, computational saturation, backpressure from downstream, or anticipation of additional events from upstream. For example by design, step 207 might not occur until backlog queue 150 overflows. Based on a software actor having sufficient backlog, step 207 resumes execution of the execution snapshot of the previous initial execution, which causes at least one indication of data to be de-queued and processed from the backlog queue of that software actor to generate a result. For example, step 207 may de-queue and process one, some, or all indications that backlog queue 150 contains, including indication 155. A separate result 160 may generated for one, some, or all of the de-queued events. For example, indication 155 may indicate a color picture that software actor 132 converts into a monochrome picture that is emitted as result 160.

After step 207, computer 100 may return to step 202 for (e.g. similar) processing of subsequent data, regardless of whether or not that data has yet arrived. Thus, computer 100 may need multiple passes through the steps of FIG. 2. In the face of multiple passes, asynchronous step 206 may occur with each pass as shown, or may occur less frequently in an embodiment. For example, step 206 may occur after a threshold count of passes, or after a threshold count of indications (which may be several multiples of the capacity of backlog queue 150), or after processing a threshold count of bytes from content 115.

Although FIG. 2 shows behavior of a single software actor such as 132, other actors (e.g. 131) may asynchronously (e.g. more or less concurrently) perform a same or similar duty cycle. Concurrent software actors, such as 131-132, may consume different streams and/or progress at different speeds and, thus at a given time, may be performing respective different steps of 201-207. For example, software actor 131 may perform more or fewer passes than software actor 132 can during a same duration.

3.0 Example Lifecycle

Figure 3:
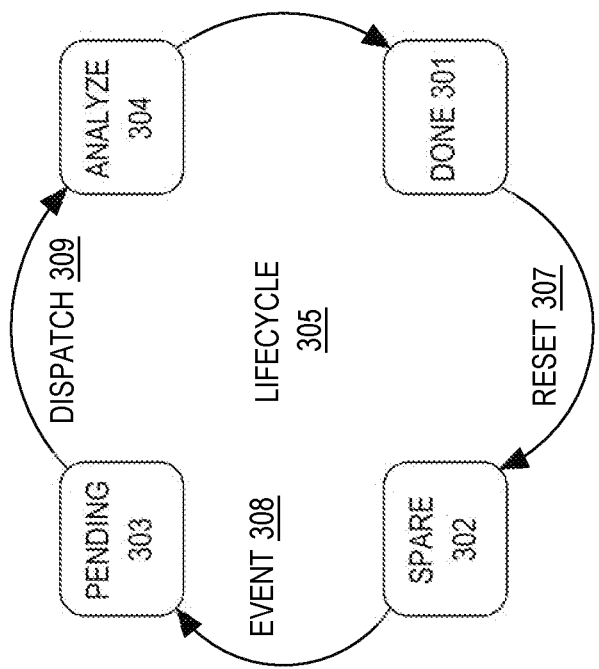
FIG. 3 is a state diagram that depicts an example computer managing software actors, embedded virtual machines, and pool(s) according to a lifecycle.

FIG. 3 is a state diagram that depicts an example computer 300, in an embodiment. Computer 300 manages software actors, embedded virtual machines, and pool(s) according to a lifecycle. Computer 300 may be an implementation of computer 100.

Computer 300 uses lifecycle 305 to manage software actor 320, embedded virtual machine 330, and a pool (not shown) of embedded virtual machines. Lifecycle 305 has states 301-304. Done 301 is both an initial state and a final state. In done 301, software actor 320 is unusable and not associated with embedded virtual machine 330, which also is unusable, such as when computer 300 boots, at which time the pool is empty (i.e. has no virtual machines). Reset 307 causes virtual machine 330 to be reloaded with an execution snapshot (not shown) and added to the pool. Reloading may load logic and data structures that implement one, some, or all kinds of software actors, as copied from the execution snapshot.

During spare 302, computer 300 is underutilized. Virtual machine 330 idles in the pool. The backlog queue (not shown) of software actor 320 is empty.

Eventually, event 308 is received from a data stream (not shown). An indication of event 308 is appended to the backlog queue of software actor 320. During pending 303, the backlog queue may receive additional events.

Eventually, dispatch 309 occurs, such as when a scheduler (not shown) detects that software actor 320 has a backlog of event(s) to process. Virtual machine 330 is removed from the pool and assigned to software actor 320. Each of the kinds of software actors that are already loaded in virtual machine 330 may have a respective analysis subroutine. By invoking the respective subroutine during analyze 304, software actor 320 executes to process and empty its backlog queue.

After the backlog is drained and processed, software actor 320 and virtual machine 330 revisit done 301. Reset 307 may more or less immediately occur again, and lifecycle 305 may repeat. Techniques involving a lifecycle and a pool of virtual machines is discussed for FIG. 4.

4.0 Concurrency

Figure 4:
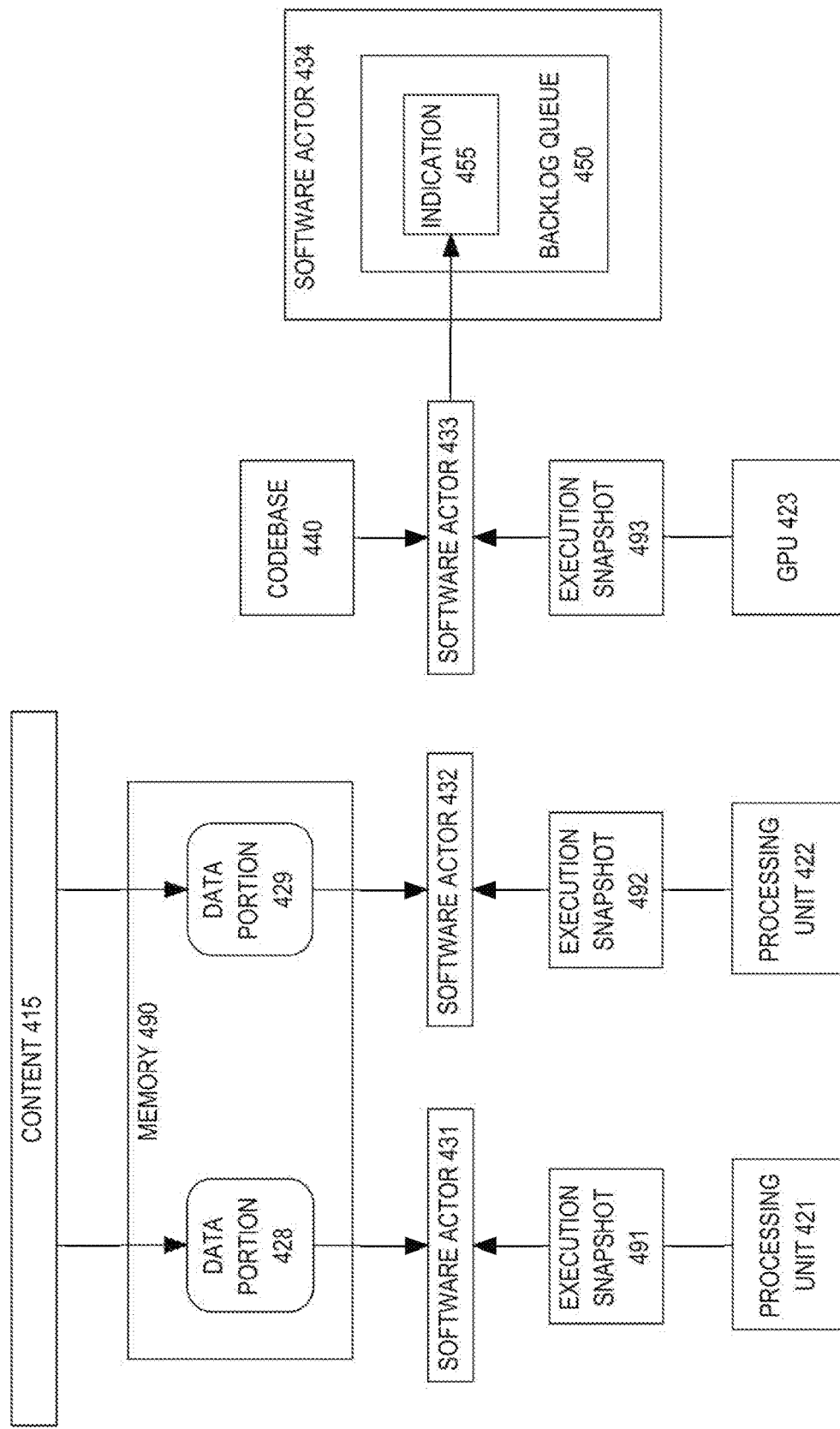
FIG. 4 is a block diagram that depicts an example computer that achieves vector parallelism, horizontal parallelism, and pipeline parallelism.

FIG. 4 is a block diagram that depicts an example computer 400, in an embodiment. Computer 400 achieves vector parallelism, horizontal parallelism, and pipeline parallelism. Computer 400 may be an implementation of computer 100.

Computer 400 uses various hardware and software techniques to increase throughput as follows. Computer 400 may maintain a pool of multiple embedded virtual machines (not shown) that are already reset (i.e. pre-loaded with execution snapshots 491-492) in anticipation of a demand spike. Computer 400 may have multiple processing units, such as 421-422, which may be separate central processing units (CPUs), separate processing cores of a same CPU, separate hyperthreads, or separate lightweight or heavyweight computational threads, thereby facilitating symmetric multiprocessing (SMP). The pool of idle embedded virtual machines may be configured to have as many (or some proportional amount of) virtual machines as available processing units 421-422 for optimal exploitation of hardware. When an individual event or backlog queue with event(s) is ready for processing by a particular software actor, an embedded virtual machine may be taken from the pool and assigned to execute the actor to process the event(s). For example, the pool may have embedded virtual machines that are respectively loaded with execution snapshots 491-492, which are the same (i.e. clones). Thus, it does not matter which virtual machine is acquired from the pool, because all of the pooled virtual machines are pre-initialized with copies of a same execution snapshot. When a software actor finishes processing its current event(s), its embedded virtual machine is reset by reloading the execution snapshot and returning the virtual machine back into the pool for reuse. For example, a same software actor may process event(s) in one virtual machine, then idle, and then reawaken to process subsequent event(s), but in a separate virtual machine from the pool.

4.1 Load Balancing

Software actors 431-432 may have different logic, but may use copies of a same execution snapshot. Thus, software actors 431-432 may be assigned arbitrary virtual machines from the pool and concurrently execute. During a data spike, computer 400 may become saturated such that the pool of spare virtual machines is emptied even though data streams continue to deliver raw data to be processed. When overloaded as such, concerns such as load balancing, fairness, priority inversion, and starvation may become problematic. As spare virtual machines are reset and returned to the pool, computer 300 may allocate pooled virtual machines to software actors based on the kinds of software actors. Computer 300 may allocate virtual machines by round robin through the kinds of software actors, such that no kind of software actor starves. Each kind of software actor may have a respective priority that may be used for weighted round robin. For example, each priority may be a positive integer that indicates a maximum count of virtual machines to be outstanding (i.e. already acquired from the pool) for that kind of software actor. Thus, software actors may be throttled by kind to achieve weighted fairness.

In an embodiment, each kind of software actor may have multiple simultaneous instances. For example, software actors 431-432 may be of a same kind and are interchangeable with each other, which facilitates horizontal scaling. For example, each instance of a same kind of software actor may have its own backlog queue. Load balancing amongst instance of a same kind of software actor may be achieved by work stealing. For example, two instances of a same kind of software actor may concurrently execute. An instance that is first to empty its backlog queue may then steal work from another instance's backlog queue. Ideally, backlog queues reside in memory that is shared by some (e.g. same kind of actor) or all software actors. For example, computer 400 may be multicore for symmetric multiprocessing (SMP), with memory 490 shared by all cores (not shown). For example, even though data portions 428-429 of content 415 may be queued at separate instances (e.g. 431-432) of a same kind of software actor that execute on separate cores, work stealing may cause both of data portions 428-429 to be processed by same software actor 431. In an embodiment, Intel thread building blocks (TBB) provide work stealing for multicore. For example, backlog queue 450 may be implemented by a TBB task pool.

4.2 Asynchrony

Even if work stealing does not occur or is not implemented, asynchrony of concurrent software actors consuming content 415 of a same data stream (not shown) may cause processing of data portions 428 to begin in one relative temporal ordering and end in a different ordering. For example, even though software actor 431 may take data portion 428 before data portion 429 exists or is taken by software actor 432, it is possible that software actor 432 finishes processing data portion 429 first. Thus, a mere FIFO such as a circular buffer may not suffice for storing data portions 428-429 because their relative ordering of creation, processing, and disposal may unpredictably vary. Thus, (e.g. centralized) management of memory 490 may be needed, such as by reference counting.

In an embodiment without work stealing, at least one instance may process (i.e. de-queue) events from its own queue, while computer 400 simultaneously appends events to backlog queue(s) of separate instance(s) that are not yet processing, which may achieve horizontal parallelism without any contention and/or synchronization of backlog queues, such as would occur with work stealing. Hardware accelerated backlog management based on bitmap(s) is discussed later herein.

4.3 Processing Unit

Computer 400 may have one or more coprocessors, such as graphics processing unit (GPU) 423. GPU 423 may be a same or different processor type as processing units 421-422. For example, computer 400 may have heterogenous processor types. Some kinds of actors may be limited to, or better suited for, execution on some kinds of processing units. For example, software actor 433 may optionally benefit from vectorized acceleration that only GPUs provide. Likewise, software actor 431 may perform operations that only the instruction set of a general purpose CPU, such as 421, provides. For example, computer 400 may have a separate pool of pre-initialized virtual machines for each type of processing unit. Depending on the embodiment, a software actor that is assigned to a GPU may execute natively on the GPU or may execute on a general purpose processor (e.g. a core) and delegate some operations to the GPU.

Pipeline parallelism may be achieved by cascading different kinds of software actors as follows. Each kind of software actor may perform a respective stage of the pipeline. An upstream software actor, such as 433, may process one event and responsively emit (i.e. generate) a different event. For example, software actor 433 may emit an event and cause indication 455 of that event to be appended onto backlog queue 450 of a downstream software actor such as 434. Although not shown, any stage of the pipeline may have fan in or fan out. For example, software actor 433 may (e.g. simultaneously) append indications onto the backlog queues of multiple downstream software actors. Likewise, the backlog queue of a same downstream software actor may receive indications from multiple upstream software actors.

4.4 Memory

The various kinds of parallelism discussed above may be used to reduce actual or apparent latency. Processing (e.g. analytics and/or overhead) latency may be more or less problematic, and computer 400 reduces latency from system overhead as follows. As described for FIG. 1, resetting a software actor (by resetting an embedded virtual machine) entails copying an execution snapshot into memory. An alternative is to fully reload the embedded virtual machine from its codebase 440 on disk. Codebase 440 is shown for demonstrative purposes because reloading from it would entail an intense computation spike and much input/output waiting (IOWAIT) due to latency of a disk or storage network. For example, loading execution snapshot 493 from disk may be faster than bootstrapping codebase 440 from disk.

In an even faster embodiment, execution snapshot(s) are retained in non-volatile (e.g. flash) or volatile memory (e.g. as a prototype that may be cloned within memory on demand). In an embodiment, the embedded virtual machine is a Lua virtual machine. Lua is a high level language with a byte-coded virtual machine and is a product of Pontifical Catholic University (PUC) of Rio de Janeiro. In a Lua embodiment, the size of an execution snapshot may be less than two megabytes, and multiple execution snapshots may fit comfortably together in random access memory (RAM). In an embodiment, disk and memory have different encodings of a same execution snapshot. Embedded virtual machines are available for Lua, Python, and Java as discussed later herein. Another embedded virtual machine may be Forth, an early virtual stack machine that is tiny enough to embed directly in silicon.

5.0 Example Topology

Figure 5:
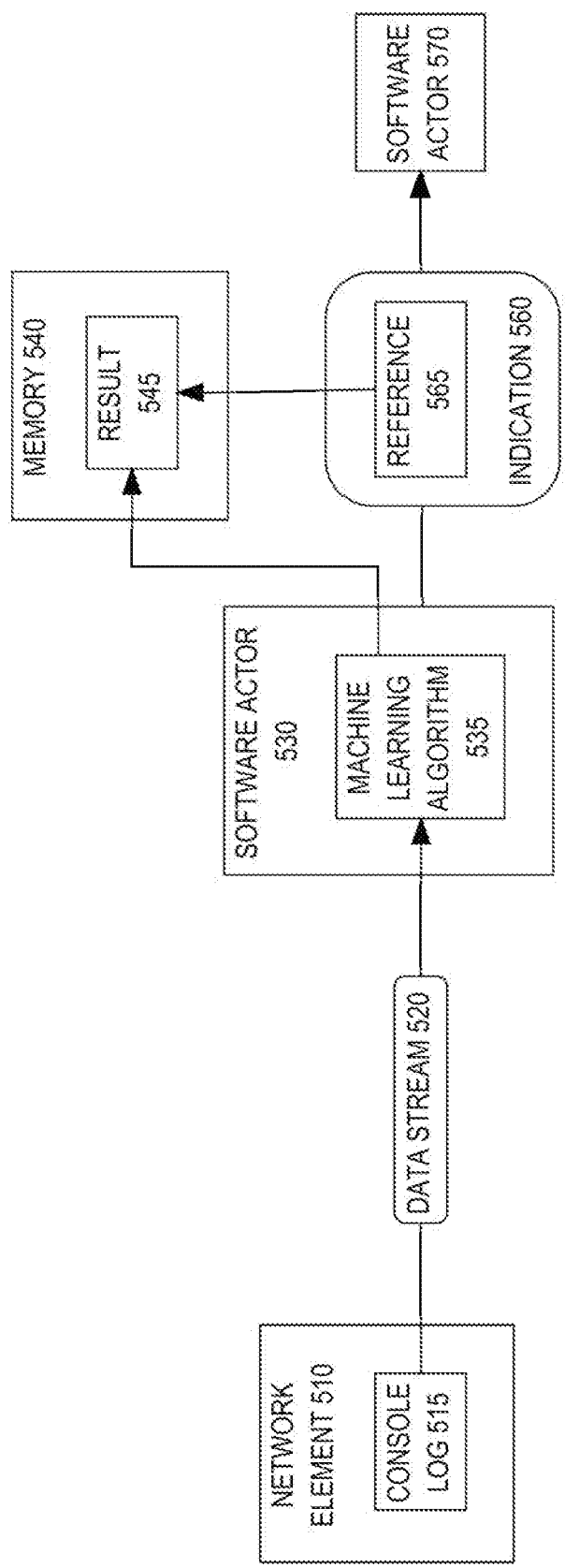
FIG. 5 is a block diagram that depicts a computer that has an example stream analytics topology.

FIG. 5 is a block diagram that depicts an example computer 500, in an embodiment. Computer 500 has an example stream analytics topology. Computer 500 may be an implementation of computer 100.

As shown, computer 500 is more or less dedicated to network activity analysis. A computer network (not shown) is composed of network elements, such as 510, that may include firewalls, bridges, routers, and switches that store and forward traffic. Network element 510 logs activity to console log 515 that is transferred (e.g. tailed) in data stream 520. Console logs of other network elements (not shown) may be interleaved within data stream 520.

5.1 Machine Learning

Software actors, such as 530, may subscribe to data stream 520. Software actor 530 includes machine learning algorithm 535 that is already trained (e.g. by deep learning) to recognize interesting patterns within data stream 520. For example, machine learning algorithm 535 may be a multi-layer perceptron (MLP) or other classifier that is trainable and/or intelligent. Machine learning algorithm 535 may be implemented with Lua's Torch machine learning library.

Machine learning algorithm 535 may be prone to false positives. For example, software actor 530 is merely an initial detector that should be double checked by another detector. For example, software actor 530 may be specialized for rapid preliminary skimming of data stream 520 that has too high a traffic volume for intensive analysis of each item in stream 520. Whereas, downstream software actor 570 may have highly accurate rules that are too slow to directly handle data stream 520. Thus, software actors 530 and 570 in serial combination achieve what neither actor could by itself: accurate analysis of high volume.

5.2 Shared Memory

That is pipeline parallelism, which may involve buffering and relaying of intermediate data between pipeline stage(s) as follows. Machine learning algorithm 535 may detect that an item within data stream 520 is suspicious. Machine learning algorithm 535 may extract and store the suspicious item as result 545 within memory 540 that is shared by software actors 530 and 570. Software actor 530 may generate and append indication 560 onto the backlog queue (not shown) of downstream software actor 570. Within indication 560, software actor 530 may include reference 565 (e.g. pointer, memory address, or offset into a buffer or array) that points to result 545 in memory 540. Thus, indication 560 may have a tiny memory footprint, and result 545 may be large.

Eventually, software actor 570 may dequeue indication 560 from the backlog queue and dereference reference 565 to access and process result 545. If result 545 should not be shared with additional downstream actors, then software actor 570 may deallocate result 545 from memory 540 after processing result 545. If result 545 may be shared with other software actors, then computer 500 may manage result 545 within memory 540 such as by reference counting.

Although result 545 is generally described above without regard to particular internal structure, implementations may use regularized, reusable, generic, and/or standardized data structure(s). For example, software actors 530 and 570 may have logic that is coded in a particular programming language that has built-in data structure(s) that are mandatory or at least especially convenient. Data structuring is discussed later for FIG. 6.

6.0 Polyglot

Figure 6:
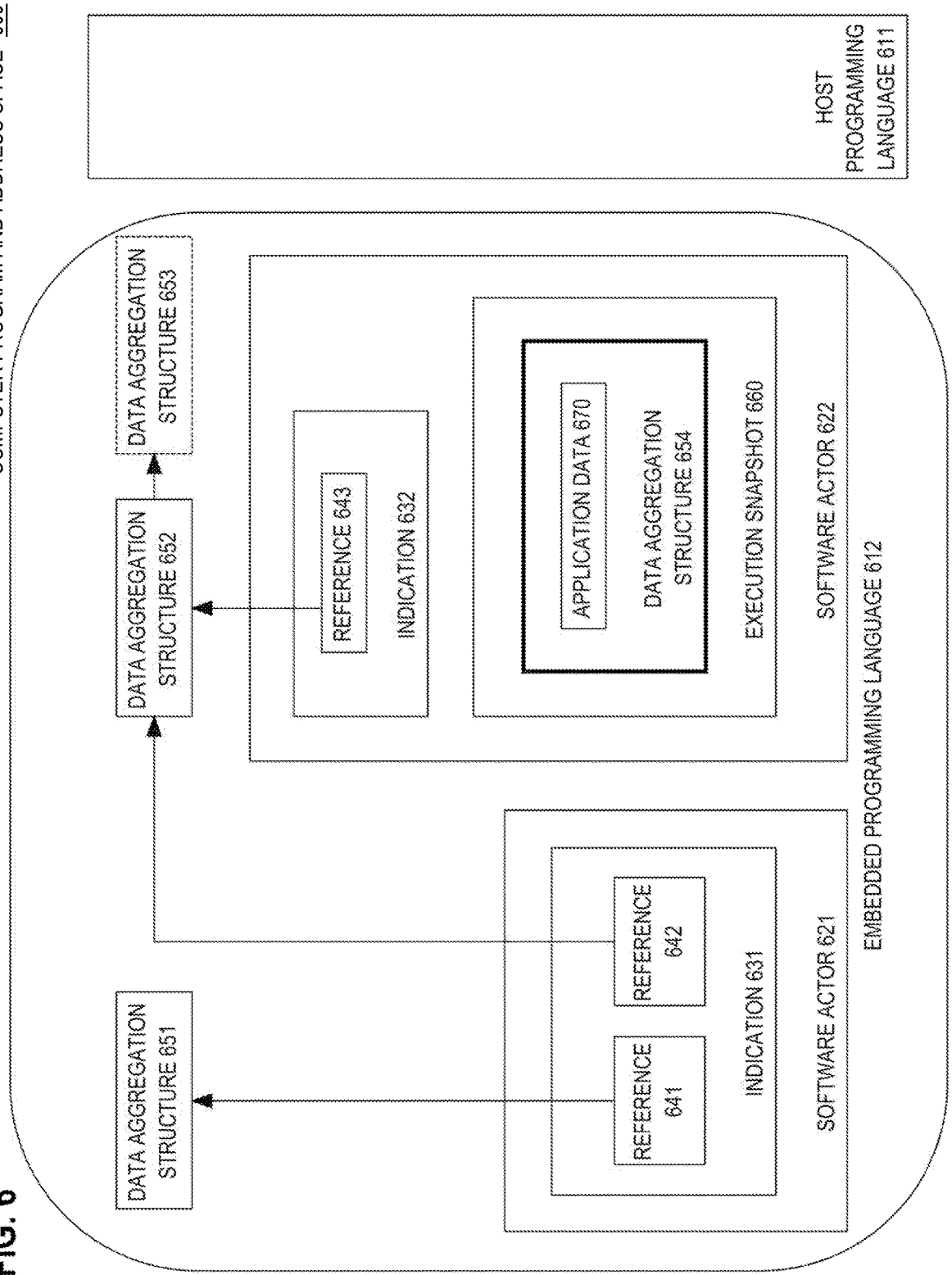
FIG. 6 is a block diagram that depicts an example computer program and address space that supports uniform data structures.

FIG. 6 is a block diagram that depicts an example computer program and address space 600, in an embodiment. Computer program and address space 600 support uniform data structures. An implementation of computer 100 may host computer program and address space 600.

Within shared address space 600 is polyglot software. A host program (e.g. software container) is coded in host programming language 611. The embeddable virtual machines (not shown) execute logic that is instead coded in embedded programming language 612, such as for implementing software actors 621-622. For example, language

611 may be C/++, and language 612 may be an extension language such as Lua that has just in time (JIT) dynamic compilation.

6.1 Lua

An embedded programming language 612 such as Lua, Python, and R have built-in data aggregation types. Lua's table and R's data frame are built-in data aggregation structures that are associative and/or tabular and whose use is expected by embedded programming language 612. For example, all retained and/or exchanged state of Lua software actors 621-622 may be more or less exclusively stored in Lua tables, which are associative arrays, such as data aggregation structures 651-654. Lua tables are extensible (i.e. polymorphic with metatables) in addition to being generic. Thus, separate Lua tables may have separate implementations, such as built-in or custom.

A software actor may obtain a data aggregation structure in various ways as follows. Data aggregation structures may be present by default, as a global, or prepared by an application, such as during an initial execution of an embedded virtual machine (not shown), which may be saved into an execution snapshot. For example, initial execution may include application logic that creates data aggregation structure 654 and populates structure 654 with application data 670. Data aggregation structure 654 may be encapsulated within execution snapshot 660 that is created during the initial execution. Thus, any embedded virtual machine that is reset by reloading execution snapshot 660 into the virtual machine will have a copy of data aggregation structure 654.

For example if embedded programming language 612 is Lua, then execution snapshot may include (or be implemented as) an instance of Lua's standard LuaState data structure that encapsulates virtual machine state in an externalizable, cloneable, and resumable way. An execution snapshot as taught herein and a LuaState may both be examples of (or implemented by) Gang of Four (GoF) software design patterns such as prototype, memento, and/or continuation.

LuaState may contain Lua table(s). Such LuaState and/or table prototypes (i.e. exemplars) may be reused (e.g. cloned) for a same kind of software actor and, in an embodiment, reused for many or all kinds of software actors.

6.2 Data Aggregation

Because a software actor may execute by invoking a custom subroutine (not shown) for that kind of actor, the subroutine's signature may facilitate injection of data aggregation structure(s). Another way to provide a data aggregation structure to a software actor is to pass the structure by reference or by value in a queued indication. For example, software actor 621 may receive and enqueue indication 631 that contains references 641-642 that refer to data aggregation structures 651-652. References can be shallow copied and then distributed to multiple software actors to facilitate sharing within shared memory. For example, same data aggregation structure 652 is referred to by both of references 642-643 that are sent in separate respective indications 631-632 to separate respective software actors 621-622. Because software actors 621-622 may or may not be a same kind of software actor, redundant references 642-643 may facilitate data sharing for horizontal scaling (i.e. same kind of actor), pipeline parallelism (i.e. different kinds of actors), or other (i.e. non-pipelined) heterogeneous topologies (e.g. publish/subscribe). Use (e.g. asynchronous) of redundant references may need memory management such as reference counting.

Another way for a software actor to obtain a data aggregation structure is to create one on demand, such as by cloning or from scratch. For example, software actor 622 may create new data aggregation structure 653. By design or by convention, such as for coherence (e.g. thread safety), some or all data aggregation structures may be immutable (i.e. read-only). For example, software actor 622 may receive and process indication 632 that delivers data aggregation structure 652 along with a request to modify structure 652. Because data aggregation structure 652 may be immutable, modification may be approximated by creating a modified copy of structure 652, such as shown with new data aggregation structure 653.

Although not shown, software actor 622 may latch (i.e. retain) and/or pass downstream reference(s) to new structure 653 in place of old structure 652. Thus, a mutable table may be approximated by two (i.e. old and new) immutable tables. There may also be subsequent additional table modifications such that several (e.g. many) versions of a same table may coexist. For example, data aggregation structures 652-653 may contemporaneously exist and be accessed by separate respective software actors and/or a same software actor. That may reduce contention and/or synchronization overhead and may be especially helpful with straggling software actors whose processing lags behind other software actors that have since moved on to more recent versions of a same table. For example, versioning may obviate a temporally wasteful synchronization barrier that would have forced fast software actors to wait for slow software actors to catch up (i.e. finish using an old version) before all actors are given a same new version. Coexisting versions may need memory management such as reference counting.

7.0 Memory Management

Figure 7:
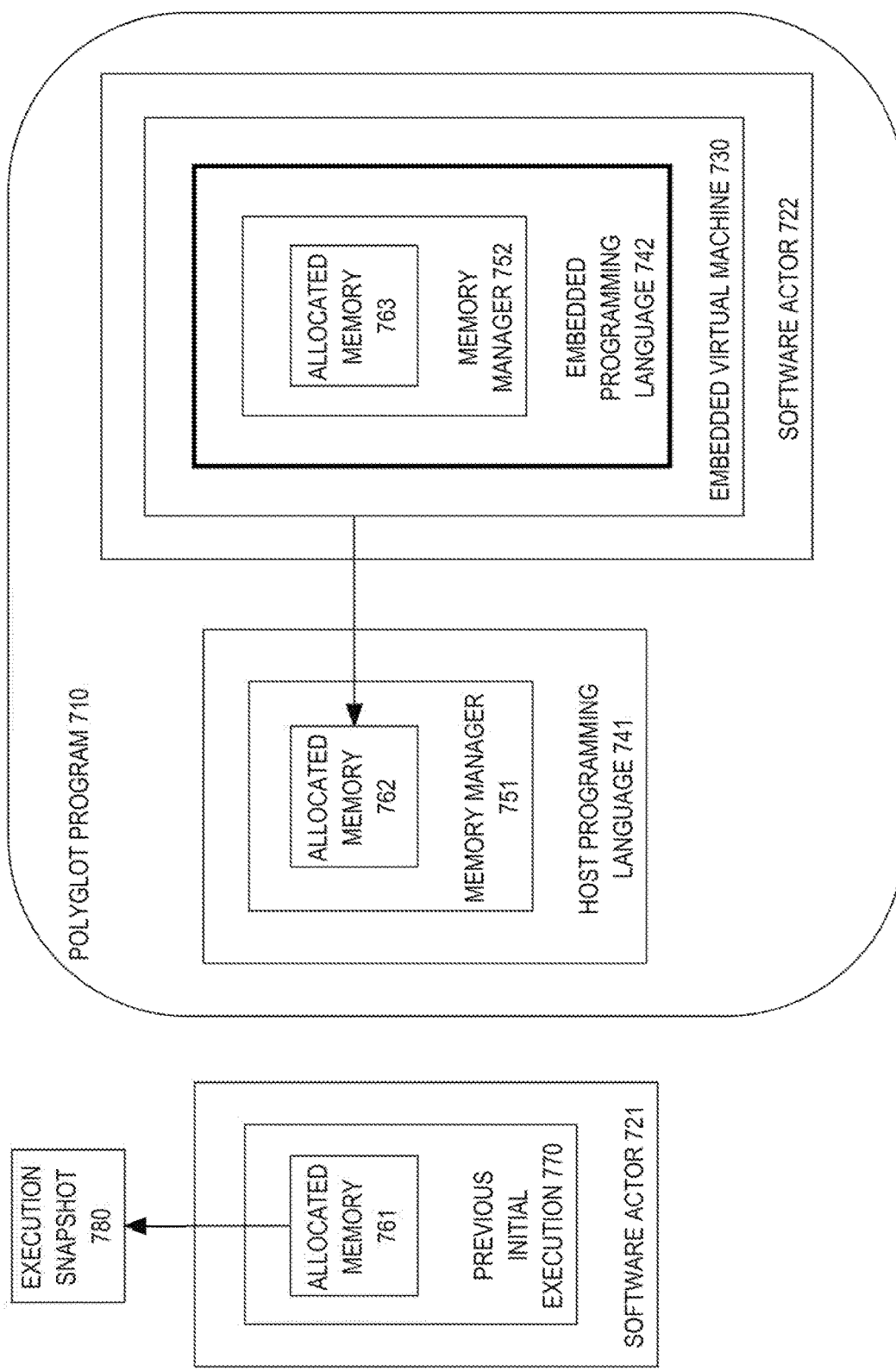
FIG. 7 is a block diagram that depicts an example computer that instruments the monitoring of separate memory subspaces (e.g. heaps) within a shared address space.

FIG. 7 is a block diagram that depicts an example computer 700, in an embodiment. Computer 700 instruments the monitoring of separate memory subspaces (e.g. heaps) within a shared address space. Computer 700 may be an implementation of computer 100.

Polyglot programming and virtual machine embedding may present memory tracking problems that may complicate the creating and reloading of an execution snapshot. Software actor 721 is shown for demonstrative purposes to illustrate how execution snapshot 780 is generally created. Software actor 721 represents a kind of software actor and/or an embedded virtual machine that contains actor 721 or any actor of any kind.

Execution snapshot 780 should not be created until the virtual machine is fully initialized, perhaps including application-specific initialization by software actor(s) such as 721. That is, execution snapshot 780 should not be created until previous initial execution 770 has finished all initialization activity. During previous initial execution 770 memory may be dynamically allocated, such as from heap(s), by the embedded virtual machine and/or software actor 721. Heap control may be wrapped, instrumented, or replaced. That may facilitate extracting and compactly copying heap content into execution snapshot 780 in a relocatable format such that pointer mathematics may be used to adjust pointers when execution snapshot 780 is later used to reset an embedded virtual machine.

7.1 Dual Heaps

Another embodiment is shown as polyglot program 710. For example, embedded programming language 742 may be Lua that involves two heaps. For example, Lua embedded virtual machine 730 may use for itself the standard heap of a host program coded in host programming language 741 such as C. Whereas, software actor 722 may instead allocate objects (e.g. Lua tables) in a separate heap provided by the Lua embedded virtual machine. Thus, dynamically allocated memory 761 may span multiple heaps.

Both heaps may be respectively instrumented as follows. The C heap is originally implemented in the standard C library, including various subroutines that may be wrapped with thunks or replaced outright, such as during static linking. For example, the malloc function may be wrapped to record the size, address, and/or content of individual allocations. Lua provides lua_Alloc as a hook to customize heap control, such as for tracking dynamic allocations by software actor 722.

For example, to create an execution snapshot during an initial execution of Lua embedded virtual machine 730, one or more kinds of software actors (not shown) may be initialized using Lua as embedded programing language 742. Using Lua 742, dynamic allocations such as allocated memory 763 may be made, which are tracked by memory manager 752 that includes (e.g. custom) lua_Alloc. Whereas, dynamic allocations by Lua embedded virtual machine 730 for itself, such as allocated memory 762, are tracked by memory manager 751 that includes (e.g. custom) malloc. Both allocated memories 762-763 should be (e.g. compactly) copied into the execution snapshot (not shown) that is being created.

8.0 Snapshot Creation

Figure 8:
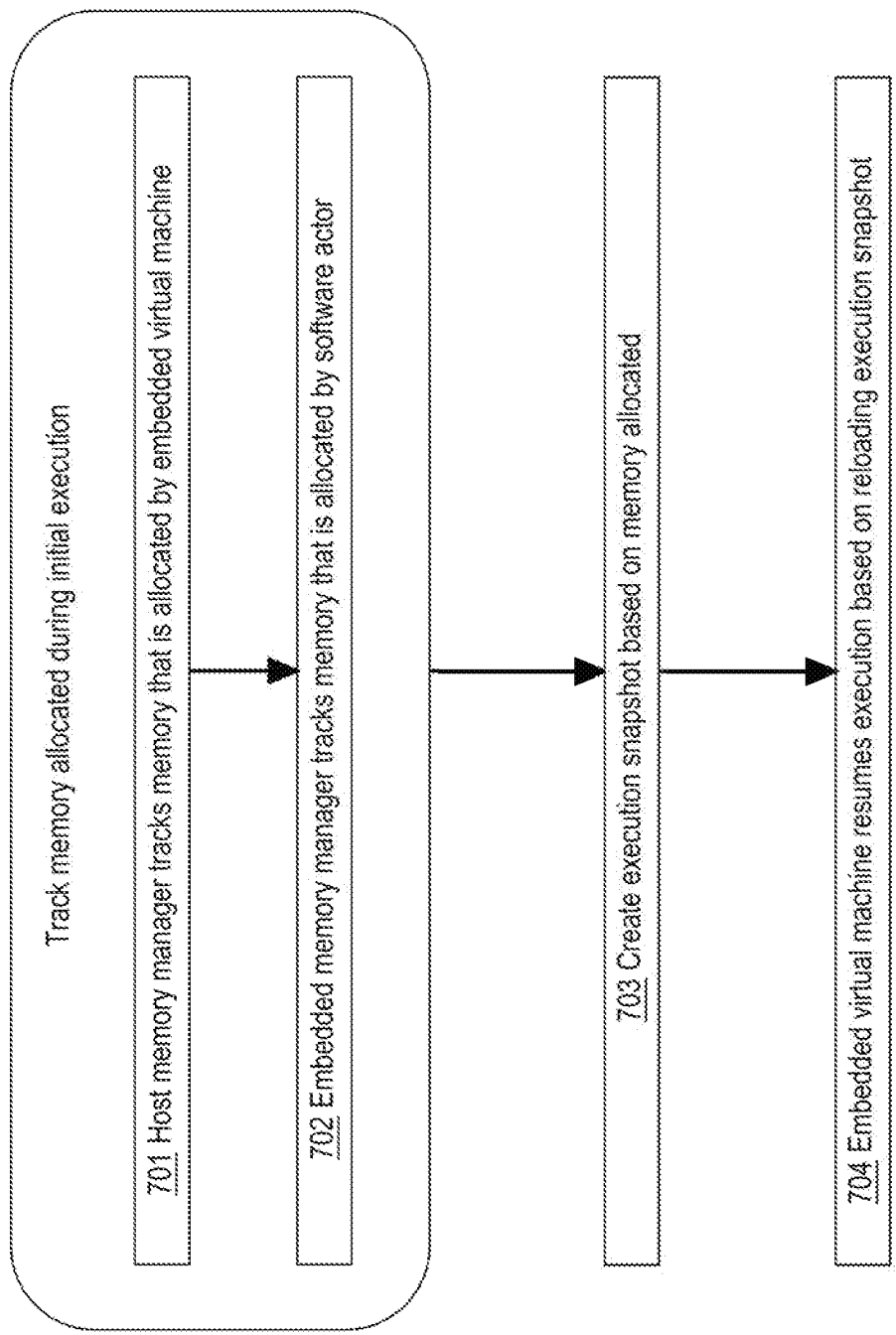
FIG. 8 is a flow diagram that depicts an example computer process for instrumenting the monitoring of separate memory subspaces (e.g. heaps) within a shared address space.

FIG. 8 is a flow diagram that depicts computer 700 instrumenting the monitoring of separate memory subspaces (e.g. heaps) within a shared address space, in an embodiment. FIG. 8 is discussed with reference to FIG. 7.

Steps 701-702 track memory allocated during an initial execution of an embedded virtual machine. Although shown in a particular relative ordering, steps 701-702 may be reversed or overlap.

In step 701, a host memory manager tracks memory that is allocated by an embedded virtual machine. For example during an initial execution of embedded virtual machine 730 in a laboratory for the purpose of creating an execution snapshot (e.g. 780), internal operation of embedded virtual machine 730 causes memory manager 751 to dynamically allocate memory 762. Memory manager 751 may be instrumented or replaced to observe and track allocated memory 762.

In step 702, an embedded memory manager tracks memory that is allocated by a software actor that executes in the embedded virtual machine. For example, the initial execution may achieve application specific data initialization by creating and initializing instance(s) or kind(s) of software actor(s), such as 722. Software actor 722 causes memory manager 752 to dynamically allocate memory 763. Memory manager 752 may be instrumented or replaced to observe and track allocated memory 763. For example, allocated memory 763 may be a Lua table that is tracked by a custom lua_Alloc subroutine.

In step 703, an execution snapshot such as 780 is created based on memory allocated during the initial execution of embedded virtual machine 730 in steps 701-702. For example, computer 700 extracts and compactly copies allocated memories 762-763 into execution snapshot 780 in a relocatable format such that pointer mathematics may be used to adjust pointers when execution snapshot 780 is later used to reset an embedded virtual machine such as 730.

Steps 701-703 prepare for step 704. For example, steps 701-703 occur during as soon as polyglot program 710 launches and before program 710 actually begins stream analytics. Although only one embedded virtual machine is used for software actor 722 during steps 701-703, program 710 may later, during step 704, have multiple embedded virtual machines from which one may be selected to execute software actor 722. Whichever embedded virtual machine is selected for execution, that virtual machine is reset by step 704. In step 704, the selected virtual machine resumes execution based on reloading the execution snapshot that was created during step 703. For example, computer 700 may copy the content of an execution snapshot such as 780 into memory that is dedicated to embedded virtual machine 730, thereby causing virtual machine 730 to be reset. Pointer mathematics may be used to adjust pointers that are internal to execution snapshot 780. After step 704, software actor 722 may immediately analyze some content of some data stream(s).

During actual stream processing, embedded programming language 742 and embedded virtual machine 730 may garbage collect allocated memory (e.g. 763) that was allocated by software actor 722 while processing streamed event(s). For example, embedded virtual machine (VM) 730 may be Lua VM or a Java VM (JVM). Because software actor 722 executes in embedded virtual machine 730 that is periodically reset (e.g. after every few events), analytics upon event(s) may finish, and virtual machine 730 may be again reset, before garbage collection is needed. Thus, garbage collection may be often or always avoided. Thus paradoxically, dynamically compiled Lua or Java bytecode might execute faster than native C whose critical path for analytics may be burdened in many places with express invocations of deallocation subroutines such as free (or C++'s delete). C's free subroutine is not offloaded to a background thread on a spare core of a CPU, which means that dynamic deallocation in C occurs in band (i.e. within the critical path of analytics). For example, a single invocation of C's free subroutine may have asymptotic computational complexity due to cascading chores such as heap traversal, defragmentation, and cache thrashing that cause the calling logic to effectively stall.

9.0 Synchronization

A software actor should not begin processing a next item from the actor's backlog queue until processing the previous item is finished. In other words, a backlog queue should be sequentially processed. Thus, some software actors may necessarily be single threaded. For example if a hypothetical software actor were multithreaded, then two items could be simultaneously dequeued and processed by two respective computation threads, which might cause the second item to be completely processed before the first item is finished. That is a race condition that could cause downstream events to be generated and sent in a wrong temporal ordering, which may cause a semantic malfunction.

Even if temporal ordering is unimportant, system throughput may be increased by using single threaded software actors as follows. For example, a single threaded backlog queue operates faster than a thread safe backlog queue because thread safe data structures typically need synchronization, which is slow. Horizontal scaling of any kind of single threaded software actor may be achieved as shown in FIG. 9.

Figure 9:
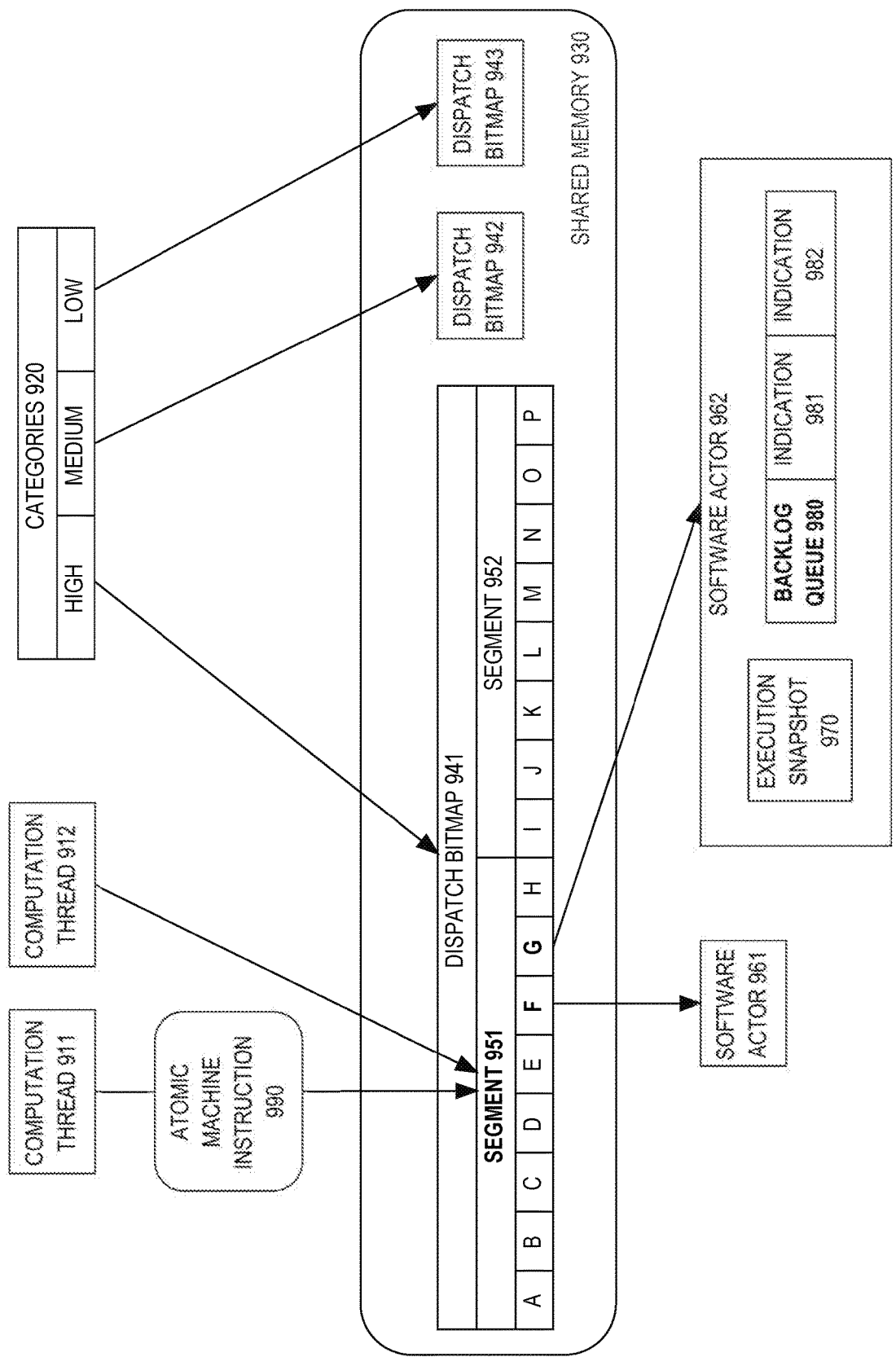
FIG. 9 is a block diagram that depicts an example computer that achieves load balancing without central coordination.

FIG. 9 is a block diagram that depicts an example computer 900, in an embodiment. Computer 900 achieves load balancing without central coordination. Computer 900 may be an implementation of computer 100.

Computer 900 contains shared memory 930 that is shared by computation threads 911-912. For example, computer 900 may be multicore. Each of computation threads 911-912 may be assigned to execute a software actor, such as 961-962, of a same or different kind of actor. When computation thread 911 finishes executing (i.e. processing a queued backlog) software actor 961, then computation thread 911 may take a fresh embedded virtual machine (not shown) from a pool (not shown) and execute software actor 962 that also has a backlog. Thus, computation thread 911 may serially execute a sequence of multiple actors.

9.1 Backlog Bitmap

However, contention may occur when multiple computation threads race to take a same next software actor for execution. For example, both of computation threads 911-912 may simultaneously attempt to acquire software actor 962 for execution, which implicates thread safety. Computer 900 uses dispatch bitmap 941 within shared memory 930 and atomic machine instructions, such as 990, to quickly assign software actor 962 to exactly one computation thread, such as 911, in a way that is horizontally scalable (i.e. parallelizable).

Dispatch bitmap 941 contains bits A-P, each of which corresponds to a respective software actor of same or different kinds. For example, bit G is associated with software actor 962. When software actor 962's backlog queue 980 is empty, bit G is clear (i.e. zero). When that backlog queue 980 is not empty, bit G is set (i.e. one). Thus, dispatch bitmap 941 indicates which of many software actors, including 961-962, have a pending backlog. Computation thread 911 should not select a software actor for execution unless the actor's corresponding bit is set in dispatch bitmap 941. Thus, computation thread 911 need not scan the backlog queues of software actors to discover which software actor has a non-empty backlog queue. Thus, selection of a software actor is accelerated.

9.2 Atomic Instruction

Contention may occur if both of computation threads 911-912 simultaneously observe that bit G is set. Atomic machine instructions, such as 990, prevent such a simultaneous observation as follows. The CPU instruction set of computer 900 includes a machine instruction that atomically reads and writes a same integer, such as a byte or a multibyte machine word. For example, atomic machine instruction 990 may operate as an atomic bitwise disjunctive-and instruction that returns the previous value of an addressable byte and then updates the addressable byte by storing a new value that results from selectively clearing bit(s) of the old value that positionally correspond to set bit(s) of a mask value given in the instruction. For example, Gnu compiler collection (GCC) offers abstractions of atomic operations that may more or less directly translate to proprietary (e.g. Itanium) atomic instructions.

For example, atomic machine instruction 990 may be an atomic bitwise-and that specifies a mask of all zeros and specifies the memory address of segment 951, which may be an addressable byte. Thus, computation thread 911 discovers which bits of segment 951 were set and simultaneously (i.e. atomically) clears all bits A-H of segment 951. Thus, computation thread 911 may simultaneously acquire as many software actors to execute as segment 951 previously had bits set. The same atomic operation may be instead achieved with an atomic exchange instruction that specifies zero as a new value to exchange with a previously stored value. However unlike an atomic exchange, an atomic bitwise-and may limit the reading and writing to a (e.g. non-adjacent) subset of bits within segment 951, which may thereby limit, to less than eight (i.e. bit count of segment 951), how many software actors may be simultaneously acquired. If computation thread 911 simultaneously acquires multiple software actors, then thread 911 may execute (i.e. process their backlogs) sequentially (i.e. one actor at a time).

Simultaneous to atomic machine instruction 990, other computation thread 912 may issue its own atomic machine instruction (not shown) that collides (i.e. coincidentally specifies same segment 951) with instruction 990. The CPU (not shown) of computer 900 ensures that both of the colliding instructions are sequentially executed. In other words, atomic machine instruction 990 will either execute first or execute after waiting for the other instruction to execute. For example, atomic machine instruction 990 may read and clear bits A-H of segment 951, and then the other instruction would execute and observe that bits A-H are clear.

9.3 Contention Heuristics

Upon finding a clear segment, computation thread 912 may issue a similar instruction for another segment, such as 952. Thus, computation thread 912 may eventually (e.g. soon) find a segment that has bit(s) set. Dispatch bitmap 941 may have many segments, such as octets (i.e. bytes), that are scanned by many threads. To maximize parallelism, each thread may start at a different (e.g. random) segment of dispatch bitmap 941, search for a non-cleared segment in a different (e.g. random) direction (i.e. leftwards or rightwards), and/or skip a different (e.g. random) amount of segments. For example, computation thread 912 may check adjacent segments, or every other segment, or every third segment. With sufficient computation threads and/or sufficient differentiation and/or randomization of segment selection, all of the segments of dispatch bitmap 941 may be frequently scanned, which avoids starvation without any central (i.e. slow) coordination.

For dispatch bitmap 941, it is presumed that all software actors associated with bitmap 941 are somewhat comparable, even if those software actors are of different kinds. For example, it is presumed that all of those software actors expect similar processing units (e.g. CPU vs. GPU) and have similar priority. Additional dispatch bitmap(s), such as 942-943, may track software actors that have a different priority or expect a different processing unit. Generally, there may be several categories 920, and each category may have its own dispatch bitmap. For example, dispatch bitmap 941 is for high priority software actors. For example, each dispatch bitmap may have its own exclusive set of computational threads to scan it, and high priority dispatch bitmap 941 may have the most threads and/or the highest priority threads.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
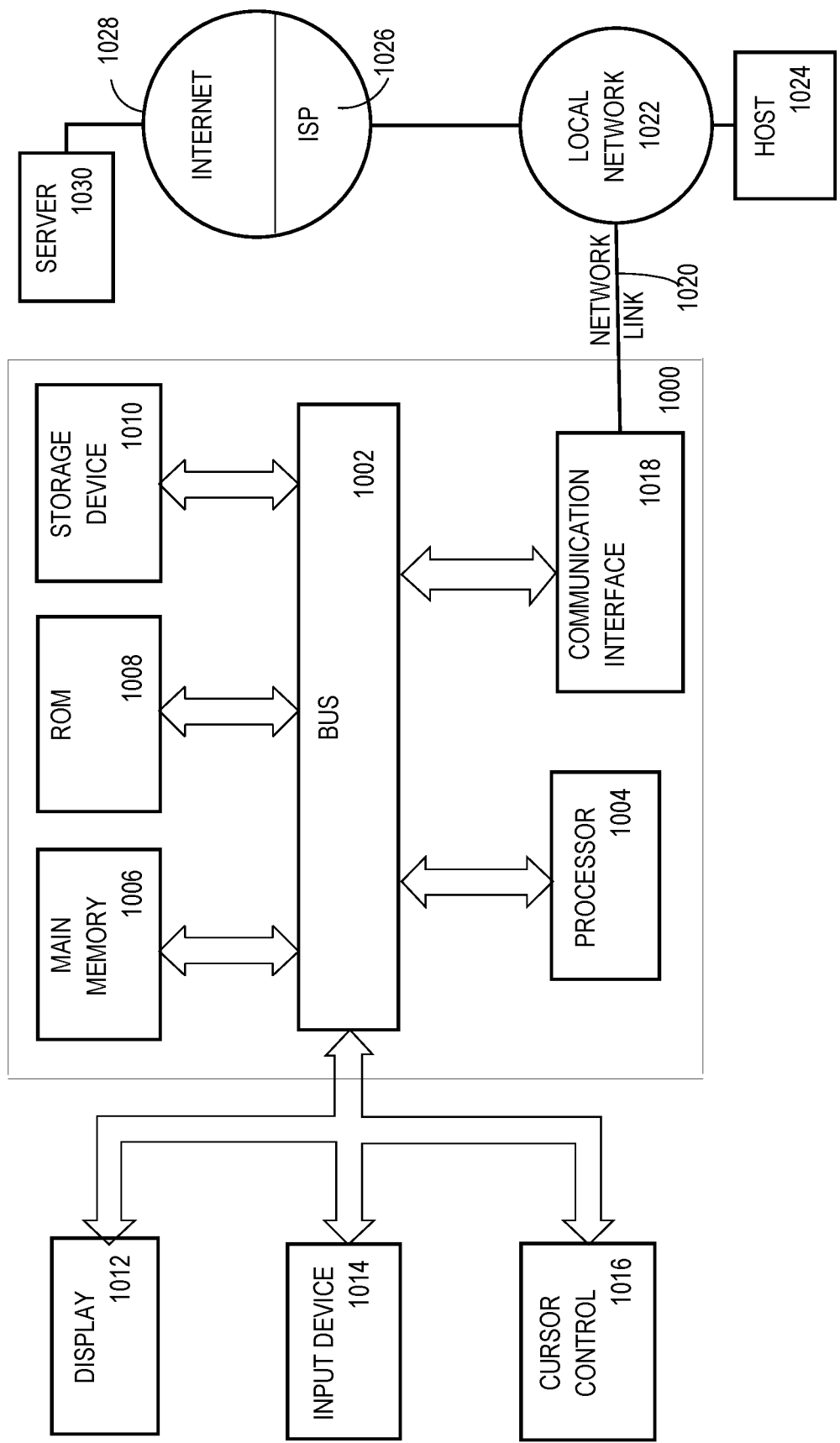
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Software Overview

Figure 11:
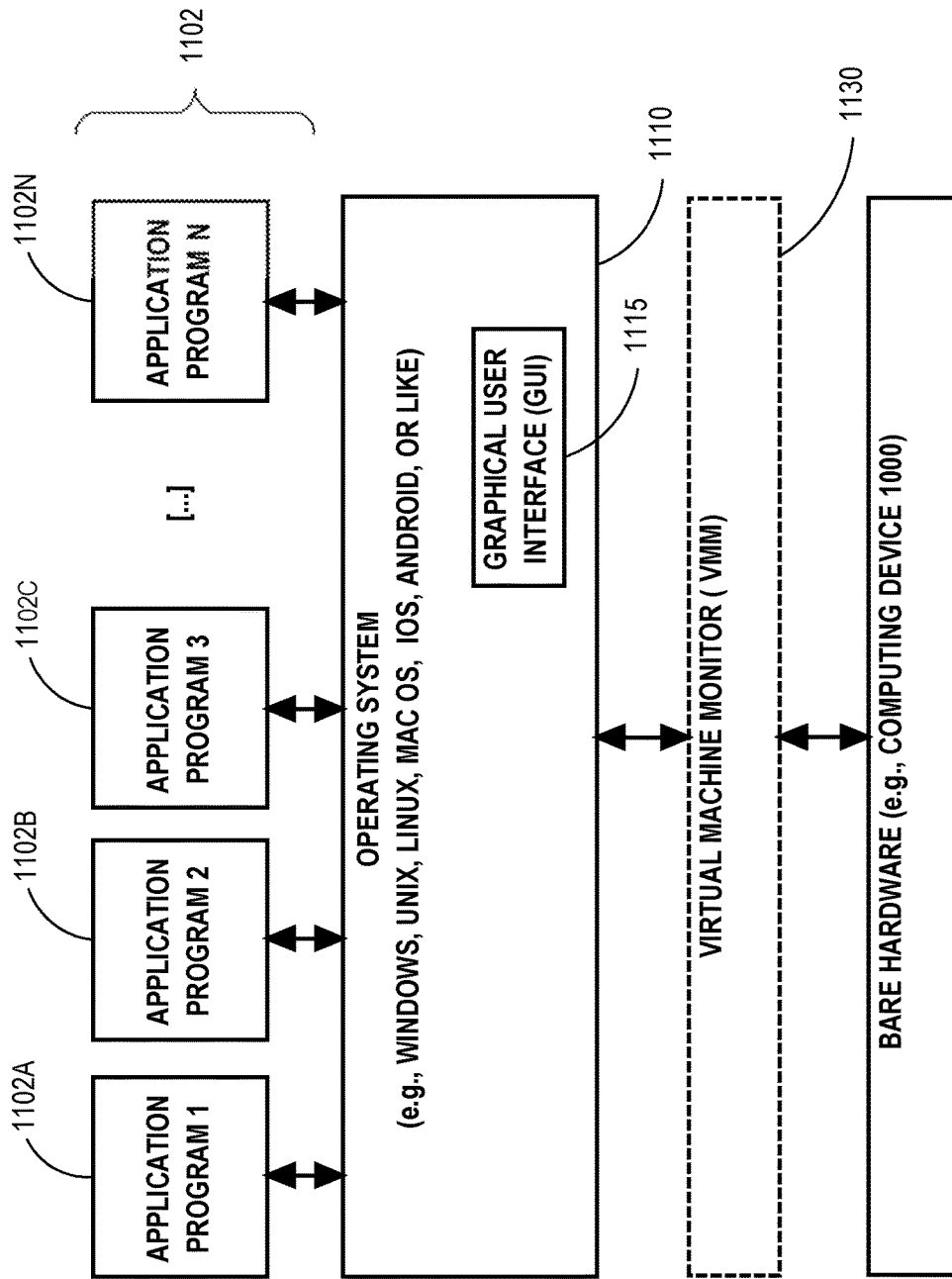
FIG. 11 is a block diagram that illustrates a basic software system that may be employed for controlling the operation of a computing system.

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 106, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 106 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1100 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   associating a particular software actor with one or more data streams, wherein said particular software actor comprises a backlog queue;
   responsive to receiving content in a subset of said one or more data streams, distributing data based on said content to the particular software actor;
   in response to determining that said data satisfies completeness criteria of the particular software actor, appending an indication of said data onto said backlog queue of said particular software actor;
   resetting, to an initial state, said particular software actor by loading, into computer memory, an execution snapshot of a previous initial execution of an embedded virtual machine;
   resuming, based on said particular software actor, execution of said execution snapshot of said previous initial execution to dequeue and process said indication of said data from said backlog queue of the particular software actor to generate a result.

2. The method of claim 1 wherein:
   said particular software actor is composed in a particular programming language;
   said execution snapshot comprises application data that populates a data aggregation structure that is predefined by said particular programming language.

3. The method of claim 2 wherein said data aggregation structure comprises an associative array.

4. The method of claim 2 wherein said indication of said data comprises one or more references to one or more instances of said data aggregation structure.

5. The method of claim 4 wherein said generate said result comprises generate a modified copy of a particular instance of said one or more instances of said data aggregation structure.

6. The method of claim 4 further comprising appending a second indication of a second data onto a backlog queue of a second software actor, wherein said second indication comprises second one or more references to said one or more instances of said data aggregation structure.

7. The method of claim 1 further comprising said particular software actor appending a second indication of said result onto a backlog queue of a second software actor.

8. The method of claim 7 wherein:
   said result resides in memory after said generate said result;
   said second indication comprises a reference to said result.

9. The method of claim 8 wherein said result resides in memory comprises said result resides in non-volatile storage.

10. The method of claim 1 wherein said loading said execution snapshot takes less time than a combined time to:
    a) load, from a codebase, said particular software actor, and
    b) initialize said particular software actor.

11. The method of claim 1 further comprising:
    tracking memory allocated during said previous initial execution of said particular software actor;
    creating said execution snapshot based on said memory allocated.

12. The method of claim 11 wherein:
    said resuming said execution is caused by a computer program that is composed in a first programming language that comprises a first memory manager;
    said particular software actor is composed in a second programming language that comprises said embedded virtual machine and a second memory manager;
    said tracking memory allocated comprises:
    tracking, by said second memory manager, memory that is allocated by said particular software actor; and
    tracking, by said first memory manager, memory that is allocated by said embedded virtual machine.

13. The method of claim 1 wherein a size of said execution snapshot of said particular software actor is less than two megabytes.

14. The method of claim 1 wherein:
    said loading said execution snapshot of said previous initial execution comprises loading multiple copies of said execution snapshot of said previous initial execution;
    said resuming execution of said execution snapshot of said previous initial execution comprises selecting a copy from said multiple copies of said execution snapshot of said previous initial execution.

15. The method of claim 14 wherein a count of said multiple copies of said execution snapshot of said previous initial execution depends on a count of available processing units.

16. The method of claim 1 wherein said particular software actor comprises a machine learning algorithm.

17. The method of claim 1 wherein a particular data stream of said one or more data streams originates from at least one network element of: a bridge, a switch, a router, a modem, or a firewall.

18. The method of claim 1 wherein a particular data stream of said one or more data streams is based on a console log.

19. The method of claim 1 wherein said particular software actor resides on a graphical processing unit (GPU).

20. The method of claim 1 wherein:
    said particular software actor is composed in a particular programming language that comprises garbage collection;
    said generate said result occurs before said garbage collection is actually needed.

21. The method of claim 1 wherein said particular software actor is composed in a particular programming language of: Lua, Forth, or Python.

22. The method of claim 1 wherein said resuming execution of said execution snapshot comprises dequeuing and processing multiple indications from said backlog queue of the particular software actor.

23. The method of claim 1 wherein said appending said indication of said data onto said backlog queue of said particular software actor comprises setting a bit that corresponds to said particular software actor in a dispatch bitmap.

24. The method of claim 23 wherein said setting said bit comprises executing an atomic machine instruction.

25. The method of claim 1 further comprising:
associating each software actor of a plurality of software actors that includes the particular software actor with the one or more data streams, wherein said each software actor comprises a respective backlog queue;
responsive to receiving content in said subset of said one or more data streams, distributing data based on said content to a subset of software actors of the plurality of software actors that are associated with said subset of said one or more data streams.

26. The method of claim 25 wherein:
said resuming said execution is caused by a computer program that is composed in a first programming language;
said computer program and said plurality of software actors share a same address space;
said particular software actor is composed in a second programming language.

27. The method of claim 26 wherein said second programming language comprises just in time compilation.

28. The method of claim 25 wherein said resuming execution comprises scheduling said execution based on weighted fairness to said plurality of software actors.

29. The method of claim 25 wherein said distributing data based on said content to said subset of software actors comprises storing said data in memory that is shared by said plurality of software actors.

30. The method of claim 29 wherein:
storing said data in memory comprises storing a first portion of said data temporally before storing a second portion of said data;
the method further comprises discarding said second portion temporally before discarding said first portion.

31. The method of claim 25 wherein:
said subset of software actors of the plurality of software actors comprises a second software actor;
said distributing data based on said content to said subset of software actors comprises:
distributing first data to said particular software actor, and distributing second data that is different than said first data to said second software actor.

32. The method of claim 25 wherein:
said appending said indication of said data onto said backlog queue of said particular software actor comprises setting a bit that corresponds to said particular software actor in a dispatch bitmap;
said dispatch bitmap comprises a plurality of segments;
each segment of said plurality of segments comprises one or more bits that correspond to software actors of said plurality of software actors that share a same category of a plurality of categories.

33. The method of claim 32 wherein said same category comprises one of: priority, type of software actor, or processor type.

34. The method of claim 32 wherein said each segment resides in memory that is shared by a plurality of computational threads.

35. One or more non-transitory computer-readable media storing instructions that, when executed by one or more processors, cause:
associating a particular software actor with one or more data streams, wherein said particular software actor comprises a backlog queue;
responsive to receiving content in a subset of said one or more data streams, distributing data based on said content to the particular software actor;
in response to determining that said data satisfies completeness criteria of the particular software actor, appending an indication of said data onto said backlog queue of said particular software actor;
resetting, to an initial state, said particular software actor by loading, into computer memory, an execution snapshot of a previous initial execution of an embedded virtual machine;
resuming, based on said particular software actor, execution of said execution snapshot of said previous initial execution to dequeue and process said indication of said data from said backlog queue of the particular software actor to generate a result.

36. The one or more non-transitory computer-readable media of claim 35 wherein:
said particular software actor is composed in a particular programming language;
said execution snapshot comprises application data in a data aggregation structure that is predefined in said particular programming language.

37. The one or more non-transitory computer-readable media of claim 36 wherein said data aggregation structure comprises an associative array.

38. The one or more non-transitory computer-readable media of claim 36 wherein said indication of said data comprises one or more references to one or more instances of said data aggregation structure.

39. The one or more non-transitory computer-readable media of claim 38 wherein said generate said result comprises generate a modified copy of a particular instance of said one or more instances of said data aggregation structure.

40. The one or more non-transitory computer-readable media of claim 38 wherein the instructions further cause appending a second indication of a second data onto a backlog queue of a second software actor, wherein said second indication comprises second one or more references to said one or more instances of said data aggregation structure.

41. The one or more non-transitory computer-readable media of claim 35 wherein the instructions further cause said particular software actor appending a second indication of said result onto a backlog queue of a second software actor.

42. The one or more non-transitory computer-readable media of claim 41 wherein:
said result resides in memory after said generate said result;
said second indication comprises a reference to said result.

43. The one or more non-transitory computer-readable media of claim 42 wherein said result resides in memory comprises said result resides in non-volatile storage.

44. The one or more non-transitory computer-readable media of claim 35 wherein said loading said execution snapshot takes less time than a combined time to: a) load, from a codebase, said particular software actor, and b) initialize said particular software actor.

45. The one or more non-transitory computer-readable media of claim 35 wherein the instructions further cause:

tracking memory allocated during said previous initial execution of said particular software actor;
creating said execution snapshot based on said memory allocated.

46. The one or more non-transitory computer-readable media of claim 45 wherein:
said resuming said execution is caused by a computer program that is composed in a first programming language that comprises a first memory manager;
said particular software actor is composed in a second programming language that comprises said embedded virtual machine and a second memory manager;
said tracking memory allocated comprises:
tracking, by said second memory manager, memory that is allocated by said particular software actor; and
tracking, by said first memory manager, memory that is allocated by said embedded virtual machine.

47. The one or more non-transitory computer-readable media of claim 35 wherein a size of said execution snapshot of said particular software actor is less than two megabytes.

48. The one or more non-transitory computer-readable media of claim 35 wherein:
said loading said execution snapshot of said previous initial execution comprises loading multiple copies of said execution snapshot of said previous initial execution;
said resuming execution of said execution snapshot of said previous initial execution comprises selecting a copy from said multiple copies of said execution snapshot of said previous initial execution.

49. The one or more non-transitory computer-readable media of claim 48 wherein a count of said multiple copies of said execution snapshot of said previous initial execution depends on a count of available processing units.

50. The one or more non-transitory computer-readable media of claim 35 wherein said particular software actor comprises a machine learning algorithm.

51. The one or more non-transitory computer-readable media of claim 35 wherein a particular data stream of said one or more data streams originates from at least one network element of: a bridge, a switch, a router, a modem, or a firewall.

52. The one or more non-transitory computer-readable media of claim 35 wherein a particular data stream of said one or more data streams is based on a console log.

53. The one or more non-transitory computer-readable media of claim 35 wherein said particular software actor resides on a graphical processing unit (GPU).

54. The one or more non-transitory computer-readable media of claim 35 wherein:
said particular software actor is composed in a particular programming language that comprises garbage collection;
said generate said result occurs before said garbage collection is actually needed.

55. The one or more non-transitory computer-readable media of claim 35 wherein said particular software actor is composed in a particular programming language of:
Lua, Forth, or Python.

56. The one or more non-transitory computer-readable media of claim 35 wherein said resuming execution of said execution snapshot comprises dequeuing and processing multiple indications from said backlog queue of the particular software actor.

57. The one or more non-transitory computer-readable media of claim 35 wherein said appending said indication of said data onto said backlog queue of said particular software actor comprises setting a bit that corresponds to said particular software actor in a dispatch bitmap.

58. The one or more non-transitory computer-readable media of claim 57 wherein said setting said bit comprises executing an atomic machine instruction.

59. The one or more non-transitory computer-readable media of claim 35 wherein the instructions further cause:
associating each software actor of a plurality of software actors that includes the particular software actor with the one or more data streams, wherein said each software actor comprises a respective backlog queue;
responsive to receiving content in said subset of said one or more data streams, distributing data based on said content to a subset of software actors of the plurality of software actors that are associated with said subset of said one or more data streams.

60. The one or more non-transitory computer-readable media of claim 59 wherein:
said subset of software actors of the plurality of software actors comprises a second software actor;
said distributing data based on said content to said subset of software actors comprises:
distributing first data to said particular software actor, and distributing second data that is different than said first data to said second software actor.

61. The one or more non-transitory computer-readable media of claim 59 wherein said distributing data based on said content to said subset of software actors comprises storing said data in memory that is shared by said plurality of software actors.

62. The one or more non-transitory computer-readable media of claim 61 wherein:
storing said data in memory comprises storing a first portion of said data temporally before storing a second portion of said data;
the instructions further cause discarding said second portion temporally before discarding said first portion.

63. The one or more non-transitory computer-readable media of claim 58 wherein said resuming execution comprises scheduling said execution based on weighted fairness to said plurality of software actors.

64. The one or more non-transitory computer-readable media of claim 59 wherein:
said appending said indication of said data onto said backlog queue of said particular software actor comprises setting a bit that corresponds to said particular software actor in a dispatch bitmap;
said dispatch bitmap comprises a plurality of segments;
each segment of said plurality of segments comprises one or more bits that correspond to software actors of said plurality of software actors that share a same category of a plurality of categories.

65. The one or more non-transitory computer-readable media of claim 64 wherein said same category comprises one of: priority, type of software actor, or processor type.

66. The one or more non-transitory computer-readable media of claim 64 wherein said each segment resides in memory that is shared by a plurality of computational threads.

67. The one or more non-transitory computer-readable media of claim 59 wherein:
said resuming said execution is caused by a computer program that is composed in a first programming language;
said computer program and said plurality of software actors share a same address space;

said particular software actor is composed in a second programming language.

68. The one or more non-transitory computer-readable media of claim 67 wherein said second programming language comprises just in time compilation.

\* \* \* \* \*

UNITED STATES PATENT AND TRADEMARK OFFICE
CERTIFICATE OF CORRECTION

PATENT NO. : 10,768,982 B2  
APPLICATION NO. : 16/135802  
DATED : September 8, 2020  
INVENTOR(S) : Brownsword et al.

Page 1 of 1

It is certified that error appears in the above-identified patent and that said Letters Patent is hereby corrected as shown below:

On the Title Page

On page 2, Column 2, item (56) under Other Publications, Line 4, delete "Enterprose" and insert -- Enterprise --, therefor.

On page 2, Column 2, item (56) under Other Publications, Line 28, delete "Fesibility" and insert -- Feasibility --, therefor.

In the Claims

In Column 28, Line 40, in Claim 63, delete "claim 58" and insert -- claim 59 --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*